United States Patent
Redgrave et al.

(10) Patent No.: US 10,789,202 B2
(45) Date of Patent: Sep. 29, 2020

(54) IMAGE PROCESSOR WITH CONFIGURABLE NUMBER OF ACTIVE CORES AND SUPPORTING INTERNAL NETWORK

(71) Applicant: Google LLC, Mountain View, CA (US)

(72) Inventors: Jason Redgrave, Mountain View, CA (US); Albert Meixner, Mountain View, CA (US); Ji Kim, Mountain View, CA (US); Ofer Shacham, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 42 days.

(21) Appl. No.: 15/594,502

(22) Filed: May 12, 2017

(65) Prior Publication Data
US 2018/0329864 A1    Nov. 15, 2018

(51) Int. Cl.
*G06F 15/80*     (2006.01)
*G06T 1/20*      (2006.01)
*G06F 15/173*    (2006.01)
*G06F 1/3234*    (2019.01)

(52) U.S. Cl.
CPC ............ *G06F 15/80* (2013.01); *G06F 1/3243* (2013.01); *G06F 15/17375* (2013.01); *G06T 1/20* (2013.01)

(58) Field of Classification Search
CPC .................. G06F 15/80; G06F 15/8015; G06F 15/17375; G06F 1/32
See application file for complete search history.

(56) References Cited

U.S. PATENT DOCUMENTS

| | | | |
|---|---|---|---|
| 5,430,885 A * | 7/1995 | Kaneko | G06F 9/30036 712/12 |
| 7,941,698 B1 * | 5/2011 | Aggarwal | G06F 11/1641 714/10 |
| 2014/0149766 A1 | 5/2014 | Samih et al. | |
| 2016/0316094 A1 | 10/2016 | Meixner et al. | |

(Continued)

FOREIGN PATENT DOCUMENTS

TW        201516953        5/2015

OTHER PUBLICATIONS

Andrew S. Tanenbaum, Structured Computer Organization, 1984, Prentice-Hall, Second edition, 5 pages (Year: 1984).*

(Continued)

*Primary Examiner* — Jyoti Mehta
(74) *Attorney, Agent, or Firm* — Fish & Richardson P.C.

(57) ABSTRACT

A method is described. The method includes configuring a first instance of object code to execute on a processor. The processor has multiple cores and an internal network. The internal network is configured in a first configuration that enables a first number of the cores to be communicatively coupled. The method also includes configuring a second instance of the object code to execute on a second instance of the processor. A respective internal network of the second instance of the processor is configured in a second configuration that enables a different number of cores to be communicatively coupled, wherein same positioned cores on the processor and the second instance of the processor have same network addresses for the first and second configurations. A processor is also described having an internal network designed to enable the above method.

12 Claims, 28 Drawing Sheets

(56) References Cited

U.S. PATENT DOCUMENTS

2017/0046198 A1    2/2017    Aolihin

OTHER PUBLICATIONS

Chapter 7 Linking, May 1, 2015, 18 pages, [retrieved from the internet on Nov. 20, 2018], retrieved from URL <csapp.cs.cmu.edu/2e/ch7-preview.pdf> (Year: 2015).*

David Ludlow, What is the difference between Core i3, i5 and i7 processors, Aug. 8, 2014, 3 pages, [retrieved from the internet on Nov. 16, 2018], retrieved from URL <www.expertreviews.co.uk/pcs/cpus/1400962/whats-the-difference-between-core-i3-i5-and-i7-processors> (Year: 2014).*

McInnes, How does the same executable file run on different computers with the same operating system but different CPU's?, Jun. 5, 2015, 3 pages, [retrieved from the internet on Nov. 16, 2018], retrieved from URL <www.quora.com/How-does-the-same-executable-file-run-on-different-computers-with-the-same-op> (Year: 2015).*

Written Opinion issued in International Application No. PCT/US2018/013582, dated Sep. 28, 2018, 7 pages.

International Search Report and Written Opinion issued in International Application No. PCT/US2018/013582, dated Apr. 12, 2018, 14 pages.

Beck et al., "Transparent Reconfigurable Acceleration for Heterogeneous Embedded Applications," Proceedings of the conference on Design, automation and test in Europe. ACM, 2008, 6 pages.

Hollingsworth et al., "Using Content-Derived Names for Configuration Management," ACM SIGSOFT Software Engineering Notes, 1997, 22:1-6.

McMillan, "Programming Models for Intel Xeon Processors and Intel Many Integrated Core (Intel MIC) Architecture," Software & Services Group, 2012, 20 pages.

Zeng, "Binary Code Reuse: a dynamic analysis based approach," The University of Texas at Dallas, 2015, 140 pages.

PCT International Preliminary Report on Patentability issued in International Application No. PCT/US2018/013582, dated Nov. 12, 2019, 8 pages.

TW Office Action in Taiwanese Appln. 107104426, dated Apr. 9, 2019, 18 pages (with English translation).

* cited by examiner

Fig. 7 configure a first instance of object code to execute on a processor, the processor having multiple cores and an internal network, the internal network configured in a first configuration that enables a first number of the cores to be communicatively coupled 701 configure a second instance of the object code to execute on a second instance of the processor, a respective internal network of the second instance of the processor configured in a second configuration that enables a different number of cores to be communicatively coupled, wherein, same positioned cores on the processor and the second instance of the processor have same network addresses for the first and second configurations 702

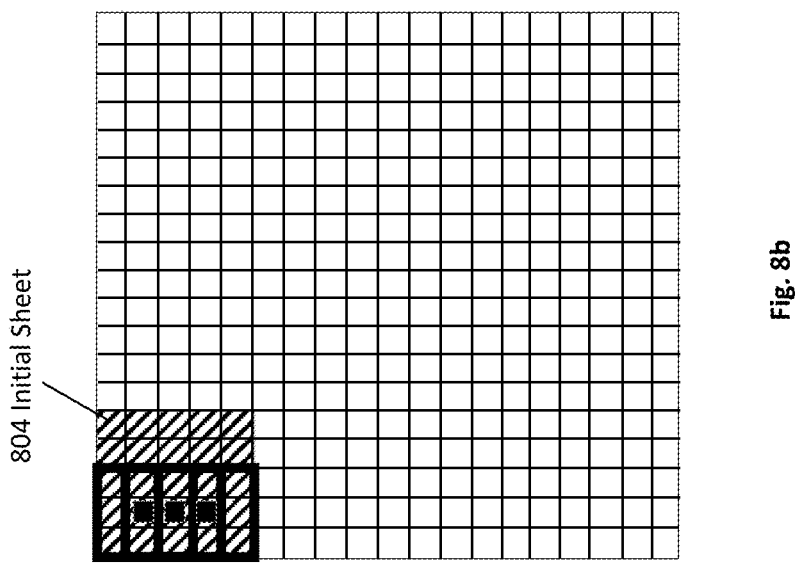

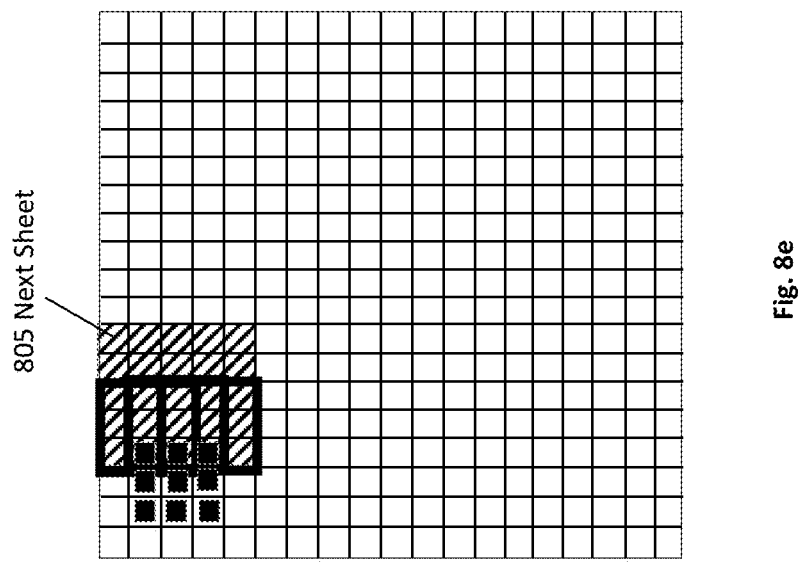

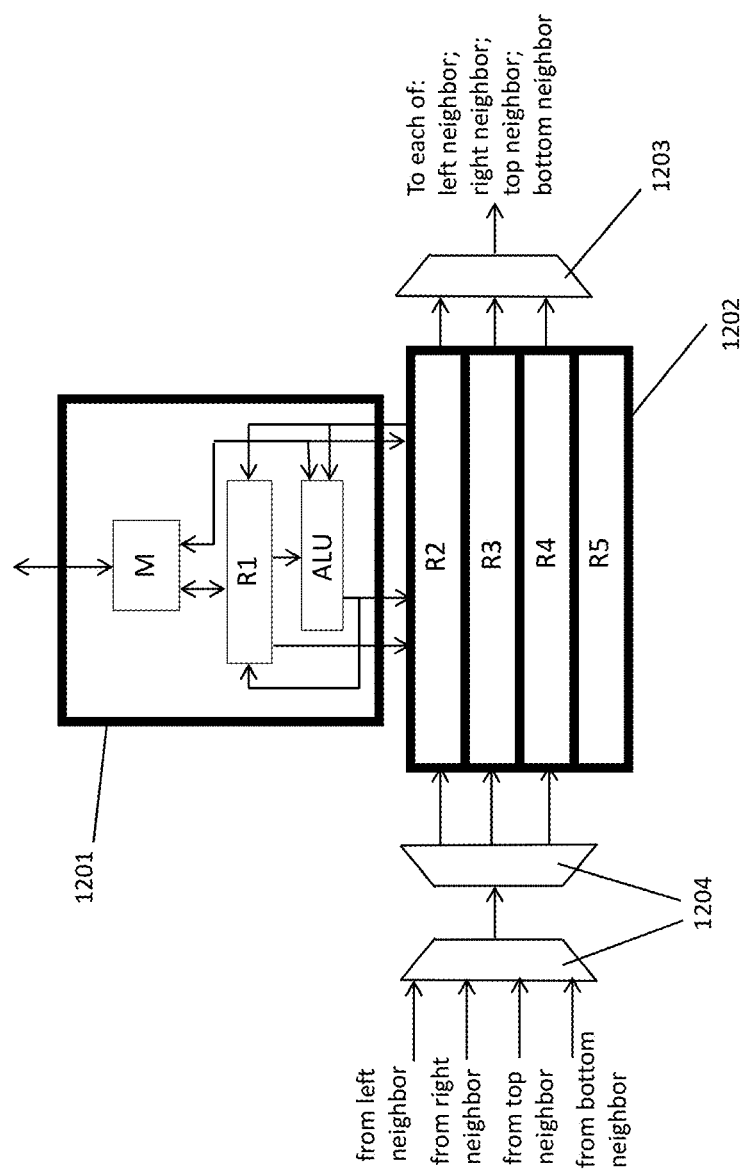

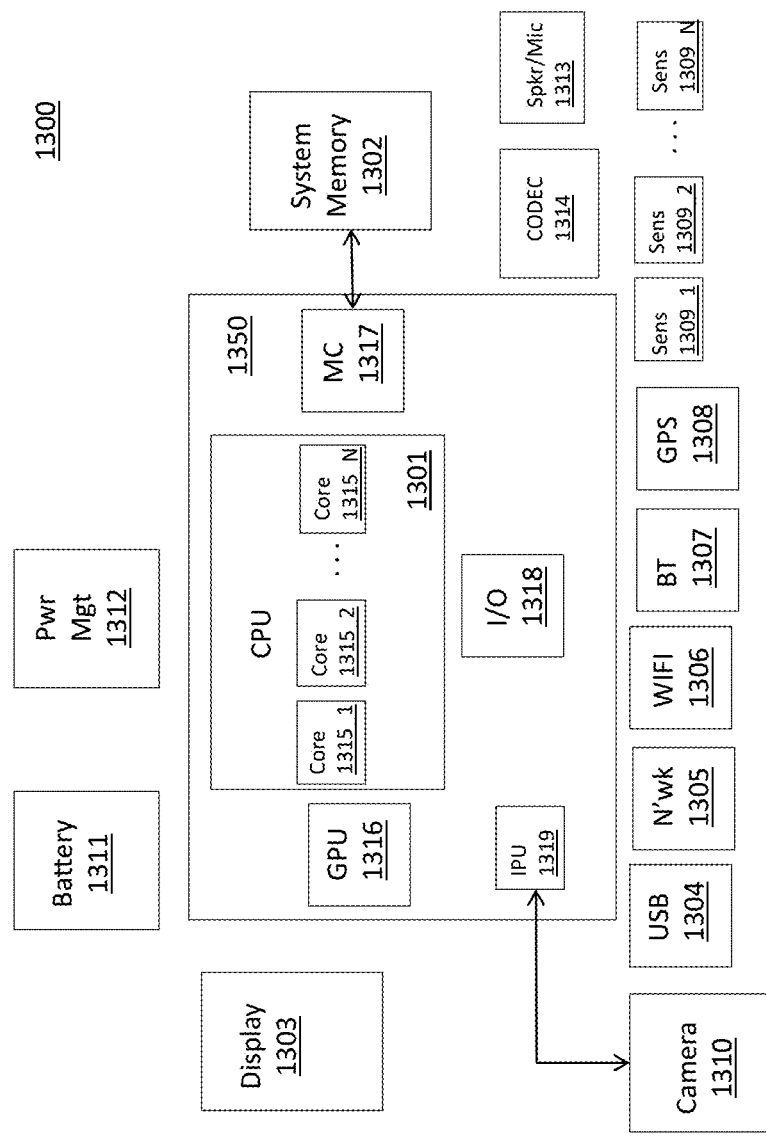

IMAGE PROCESSOR WITH CONFIGURABLE NUMBER OF ACTIVE CORES AND SUPPORTING INTERNAL NETWORK

FIELD OF INVENTION

The field of invention pertains generally to the computing sciences and, more specifically, to an image processor with a configurable number of active cores and a supporting internal network.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hard-wired circuitry to much larger units of data. The use of larger (as opposed to finer grained) units of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

A method is described. The method includes configuring a first instance of object code to execute on a processor. The processor has multiple cores and an internal network. The internal network is configured in a first configuration that enables a first number of the cores to be communicatively coupled. The method also includes configuring a second instance of the object code to execute on a second instance of the processor. A respective internal network of the second instance of the processor is configured in a second configuration that enables a different number of cores to be communicatively coupled, wherein, same positioned cores on the processor and the second instance of the processor have same network addresses for the first and second configurations. A processor is also described having an internal network designed to enable the above method.

FIGURES

The following description and accompanying drawings are used to illustrate embodiments of the invention. In the drawings:

FIG. 7 shows a processor configuration method;

FIGS. 8a, 8b, 8c, 8d and 8e depict the parsing of image data into a line group, the parsing of a line group into a sheet and the operation performed on a sheet with overlapping stencils;

FIG. 12 shows an embodiment of a unit cell for an integrated execution lane array and two-dimensional shift array;

FIG. 13 shows an exemplary computing system.

DETAILED DESCRIPTION

1.0 Unique Image Processor Architecture

As is known in the art, the fundamental circuit structure for executing program code includes an execution stage and register space. The execution stage contains the execution units for executing instructions. Input operands for an instruction to be executed are provided to the execution stage from the register space. The resultant that is generated from the execution stage's execution of an instruction is written back to the register space.

Execution of a software thread on a traditional processor entails sequential execution of a series of instructions through the execution stage. Most commonly, the operations are "scalar" in the sense that a single resultant is generated from a single input operand set. However in the case of "vector" processors, the execution of an instruction by the execution stage will generate a vector of resultants from a vector of input operands.

Figure 1:
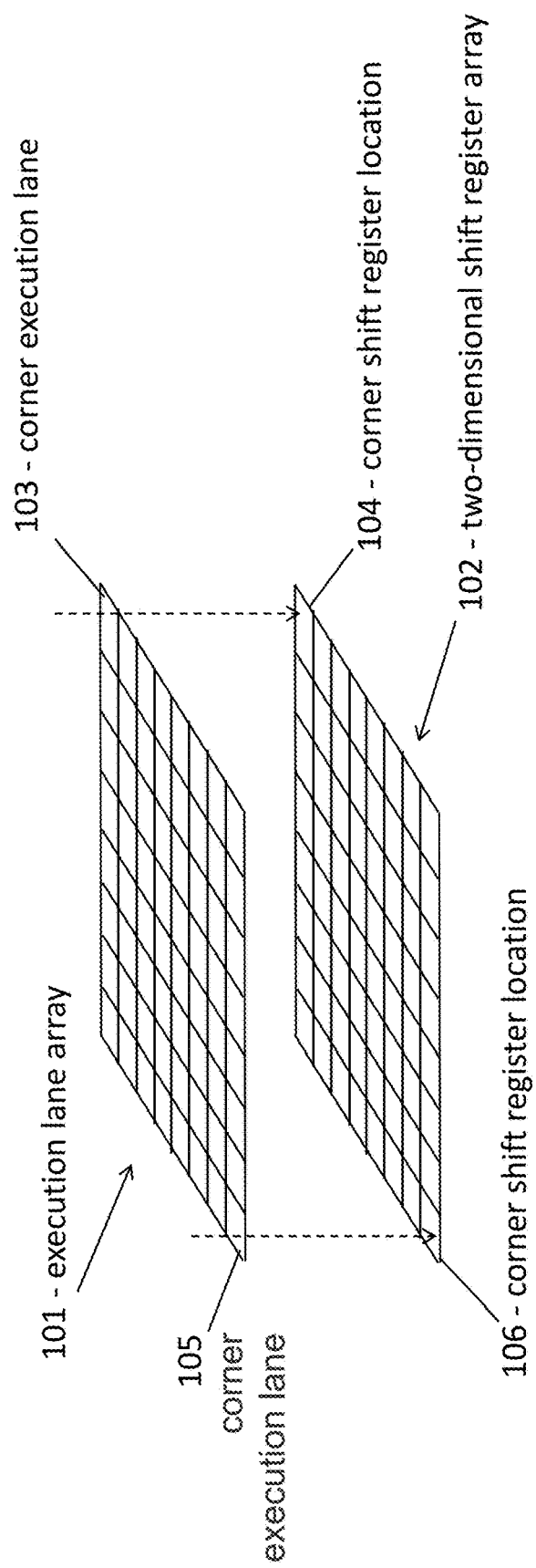
FIG. 1 shows a high level view of a stencil processor architecture.

FIG. 1 shows a high level view of a unique image processor architecture 100 that includes an array of execution lanes 101 coupled to a two-dimensional shift register array 102. Here, each execution lane in the execution lane array can be viewed as a discrete execution stage that contains the execution units needed to execute the instruction set supported by the processor 100. In various embodiments each execution lane receives a same instruction to execute in a same machine cycle so that the processor operates as a two dimensional single instruction multiple data (SIMD) processor.

Each execution lane has its own dedicated register space in a corresponding location within the two dimensional shift register array 102. For example, corner execution lane 103 has its own dedicated register space in corner shift register location 104, corner execution lane 105 has its own dedicated register space in corner shift register location 106, etc.

Additionally, the shift register array 102 is able to shift its contents so that each execution lane is able to directly operate, from its own register space, upon a value that was resident in another execution lane's register space during a prior machine cycle. For example, a +1 horizontal shift causes each execution lane's register space to receive a value from its leftmost neighbor's register space. On account of an ability to shift values in both left and right directions along a horizontal axis, and shift values in both up and down directions along a vertical axis, the processor is able to efficiently process stencils of image data.

Here, as is known the art, a stencil is a slice of image surface area that is used as a fundamental data unit. For example, a new value for a particular pixel location in an output image may be calculated as an average of the pixel values in an area of an input image that the particular pixel location is centered within. For example, if the stencil has a dimension of 3 pixels by 3 pixels, the particular pixel location may correspond to the middle pixel of the 3×3 pixel array and the average may be calculated over all nine pixels within the 3×3 pixel array.

According to various operational embodiments of the processor 100 of FIG. 1, each execution lane of the execution lane array 101 is responsible for calculating a pixel value for a particular location in an output image. Thus, continuing with the 3×3 stencil averaging example mentioned just above, after an initial loading of input pixel data and a coordinated shift sequence of eight shift operations within the shift register, each execution lane in the execution lane array will have received into its local register space all nine pixel values needed to calculate the average for its corresponding pixel location. That is, the processor is able to simultaneously process multiple overlapping stencils centered at, e.g., neighboring output image pixel locations. Because the processor architecture of FIG. 1 is particularly adept at processing over image stencils it may also be referred to as a stencil processor.

Figure 2:
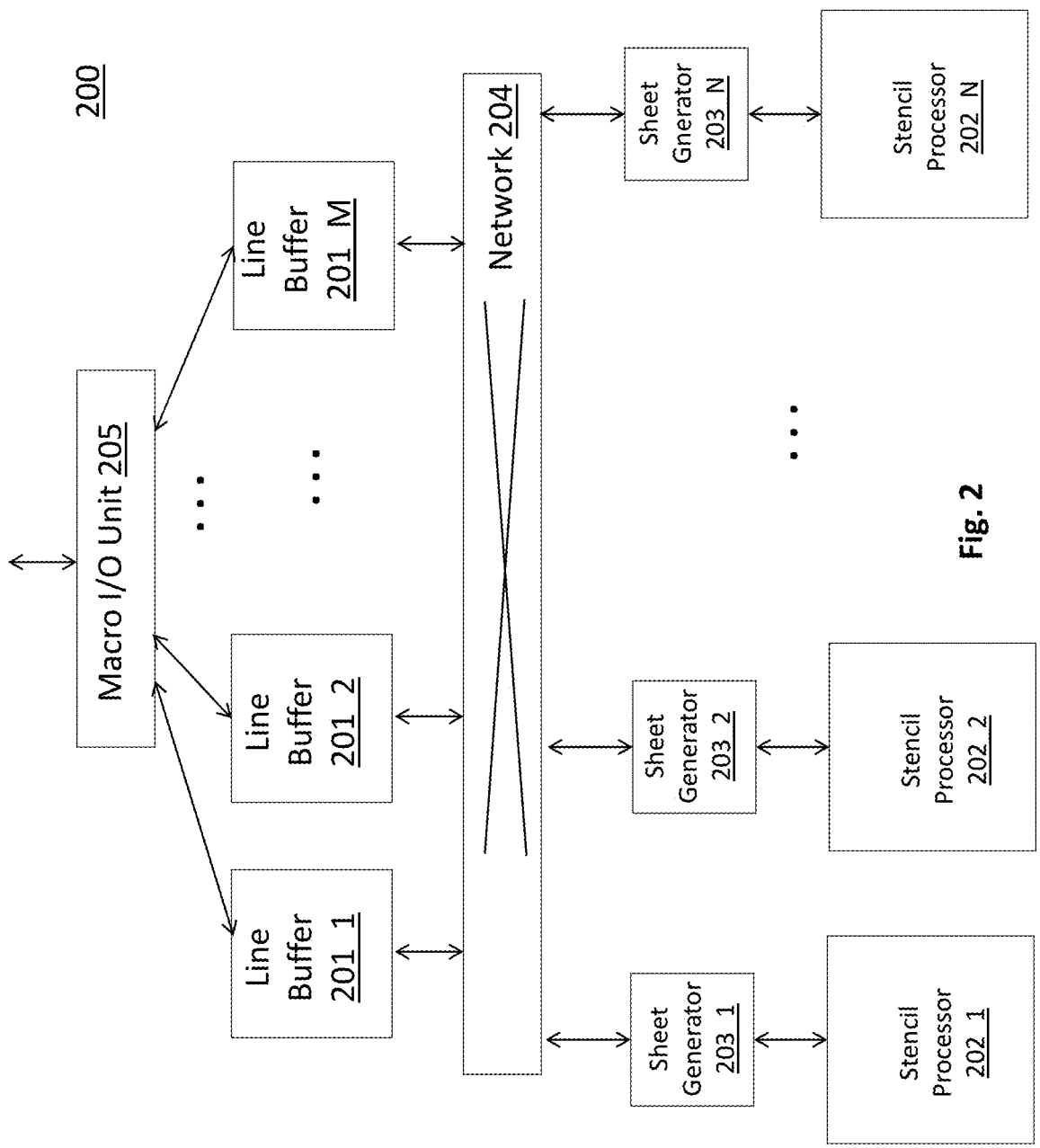
FIG. 2 shows a more detailed view of an image processor architecture.

FIG. 2 shows an embodiment of an architecture 200 for an image processor having multiple stencil processors 202_1 through 202_N. As observed in FIG. 2, the architecture 200 includes a plurality of line buffer units 201_1 through 201_M interconnected to a plurality of stencil processor units 202_1 through 202_N and corresponding sheet generator units 203_1 through 203_N through a network 204 (e.g., a network on chip (NOC) including an on chip switch network, an on chip ring network or other kind of network). In an embodiment, any line buffer unit 201_1 through 201_M may connect to any sheet generator 203_1 through 203_N and corresponding stencil processor 202_1 through 202_N through the network 204.

Program code is compiled and loaded onto a corresponding stencil processor 202 to perform the image processing operations earlier defined by a software developer (program code may also be loaded onto the stencil processor's associated sheet generator 203, e.g., depending on design and implementation). As such, each stencil processor 202_1 through 202_N may be more generally characterized as a processing core, processor core, core and the like and the overall image processor may be characterized as a multi-core image processor. In at least some instances an image processing pipeline may be realized by loading a first kernel program for a first pipeline stage into a first stencil processor 202_1, loading a second kernel program for a second pipeline stage into a second stencil processor 202_2, etc. where the first kernel performs the functions of the first stage of the pipeline, the second kernel performs the functions of the second stage of the pipeline, etc. and additional control flow methods are installed to pass output image data from one stage of the pipeline to the next stage of the pipeline.

In other configurations, the image processor may be realized as a parallel machine having two or more stencil processors 202_1, 202_2 operating the same kernel program code. For example, a highly dense and high data rate stream of image data may be processed by spreading frames across multiple stencil processors each of which perform the same function.

In yet other configurations, essentially any directed acyclic graph (DAG) of kernels may be loaded onto the image processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 205 and passed to one or more of the line buffer units 201 on a frame by frame basis. A particular line buffer unit parses its frame of image data into a smaller region of image data, referred to as a "line group", and then passes the line group through the network 204 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 201_1 which parses the image data into line groups and directs the line groups to the sheet generator 203_1 whose corresponding stencil processor 202_1 is executing the code of the first kernel in the pipeline/DAG. Upon completion of operations by the stencil processor 202_1 on the line groups it processes, the sheet generator 203_1 sends output line groups to a "downstream" line buffer unit 201_2 (in some use cases the output line group may be sent back to the same line buffer unit 201_1 that earlier had sent the input line groups).

One or more "consumer" kernels that represent the next stage/operation in the pipeline/DAG executing on their own respective other sheet generator and stencil processor (e.g., sheet generator 203_2 and stencil processor 202_2) then receive from the downstream line buffer unit 201_2 the image data generated by the first stencil processor 202_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

As alluded to above with respect to FIG. 1, each stencil processor 202_1 through 202_N is designed to simultaneously operate on multiple overlapping stencils of image data. The multiple overlapping stencils and internal hardware processing capacity of the stencil processor effectively determines the size of a sheet. Again, as discussed above, within any of stencil processors 202_1 through 202_N, arrays of execution lanes operate in unison to simultaneously process the image data surface area covered by the multiple overlapping stencils.

Additionally, in various embodiments, sheets of image data are loaded into the two-dimensional shift register array of a stencil processor 202 by that stencil processor's corresponding (e.g., local) sheet generator 203. The use of sheets and the two-dimensional shift register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable. More details concerning the operation of the line buffer units, sheet generators and stencil processors are provided further below in Section 3.0.

Figure 3:
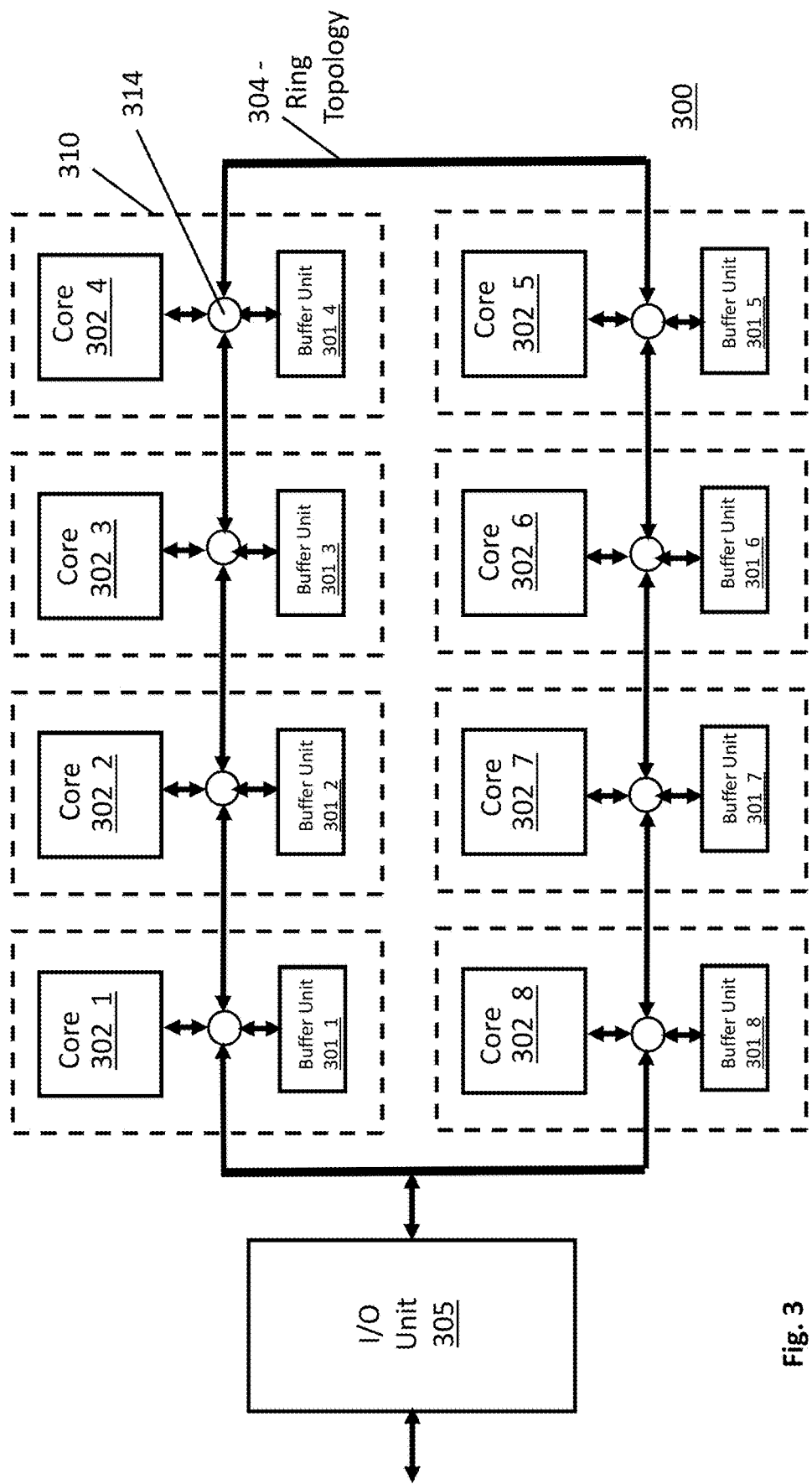
FIG. 3 shows an even more detailed view of an image processor architecture.

FIG. 3 shows a more detailed embodiment of a specific hardware implementation of the image processor of FIG. 2. As observed in FIG. 3, the network 204 of FIG. 2 is implemented in a ring topology 304 with a 4×4 network node 314 at each intersection between a line buffer unit 301 and sheet generator/stencil processor core 302. For simplicity, FIG. 3 only labels the network node 314 that resides between line buffer unit 301_4 and sheet generator/stencil processor core 302_4.

Here, each of sheet generator/stencil processor cores 302_1 through 302_8 are understood to include both a stencil processor and its corresponding sheet generator. For simplicity, each of the sheet generator/stencil processor cores 302_1 through 302_8 will hereinafter be referred to simply as a stencil processor core or core. Although eight line buffer units 301_1 through 301_8 and eight cores 302_1 through 402_8 are depicted in the particular embodiment of FIG. 3 it should be understood that different architectures are possible having different numbers of line buffer units and/or cores. Network topologies other than a ring topology are also possible.

With respect to the image processor of FIG. 3, the ring network 304 permits: 1) the I/O unit 305 to pass input data to any line buffer unit 301_1 through 301_8 (or any core 302_1 through 302_8); 2) any line buffer unit 301_1 to 301_8 to forward a line group to any core 302_1 through 302_8; 3) any core 302_1 through 302_8 to pass its output data to any line buffer unit 301_1 through 301_8; and, 4) any line buffer unit 301_1 through 301_8 to pass image processor output data to I/O unit 305. As such, a wealth of different software kernel loading options and internal network configurations are possible. That is, theoretically, for any software application composed of multiple kernels to be executed on the various cores 302 of the processor, any kernel can be loaded onto any core and any line buffer unit can be configured to source/sink input/output data to/from any core.

Figure 4:
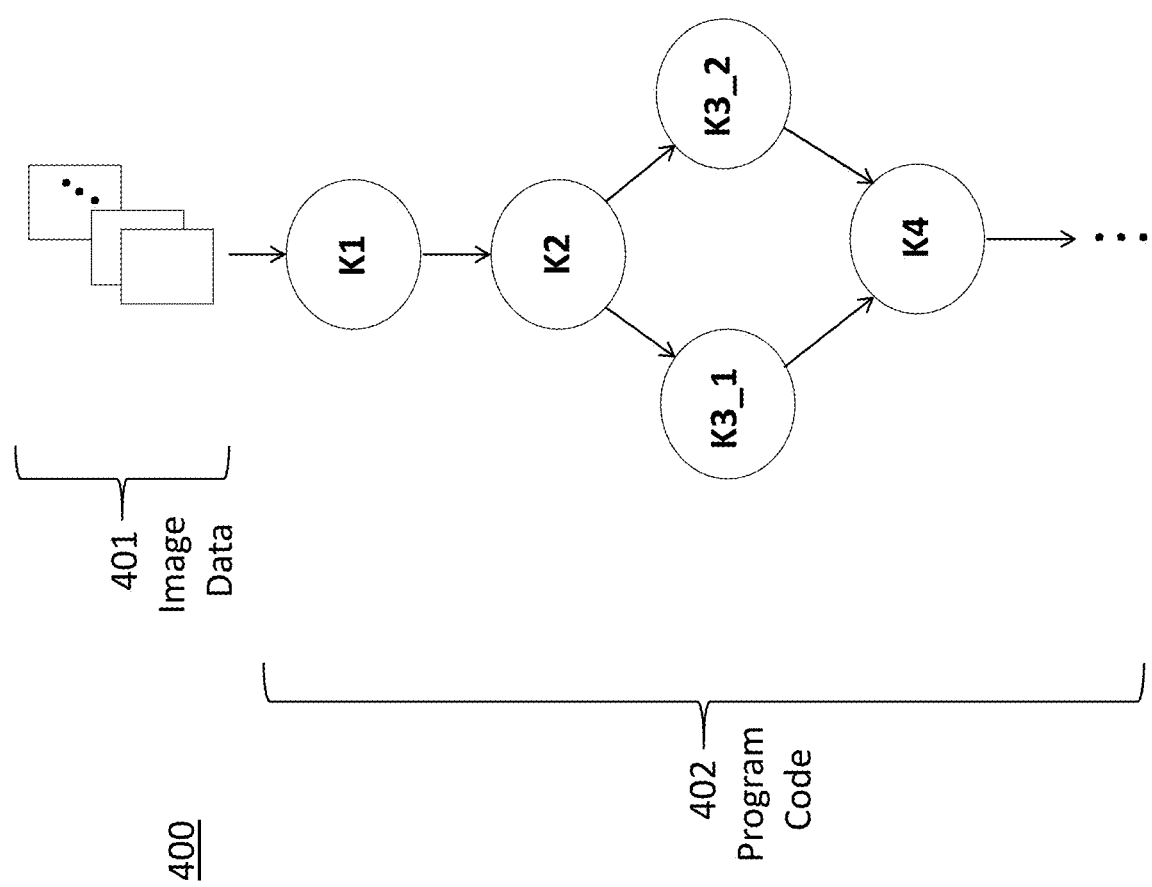
FIG. 4 shows an application software program that can be executed by an image processor.

FIG. 4 shows an exemplary application software program 400 or portion thereof that may be loaded onto the image processor of FIG. 3. As observed in FIG. 4, the program code may be expected to process one or more frames of input image data 401 to effect some overall transformation on the input image data 401. The transformation is realized with the operation of one or more kernels of program code 402 that operate on the input image data in an orchestrated sequence articulated by the application software developer.

In the example of FIG. 4, the overall transformation is effected by first processing each input image with a first kernel K1. The output images produced by kernel K1 are then operated on by kernel K2. Each of the output images produced by kernel K2 are then operated on by kernel K3_1 or K3_2, The output images produced by kernel(s) K3_1/K3_2 are then operated on by kernel K4. In the particular example of FIG. 3, Kernels K3_1 and K3_2 may be, e.g., different kernels that perform different image processing operations (e.g., kernel K3_1 operates on input images of a first specific type and kernel K3_2 operates on input images of a second, different type).

For simplicity only four kernels K1 through K4 are shown. In reference to the image processor hardware architecture embodiment of FIG. 3, note that, in a basic configuration where each kernel operates on a different stencil processor, conceivably, four more kernels may flow from kernel K4 before all the cores 302 of the processor have a corresponding kernel (the four kernel flow of FIG. 4 only utilizes half the cores of the processor of FIG. 3).

Figure 5:
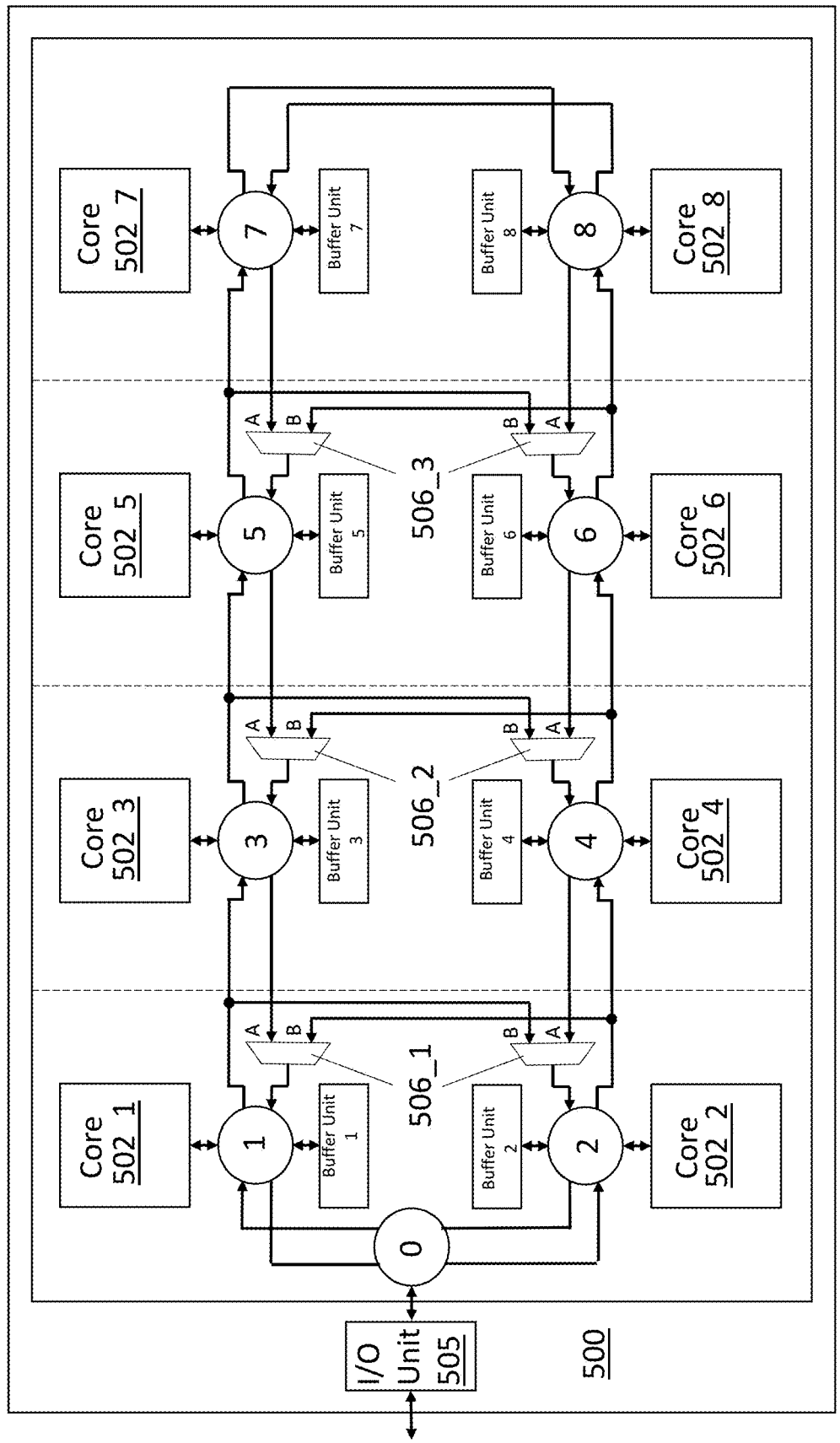
FIG. 5 shows the image processor of FIG. 3 with the network ring configured to support a configurable number of active cores.

2.0 Image Processor with Configurable Number of Cores and Supporting Internal Network FIG. 5 shows an embodiment 500 of the image processor of FIG. 3 with a more detailed view of the ring network implementation and the specific addresses that are assigned to each node on the network ring. As observed in FIG. 5, the ring network includes multiplexer pairs 506_1, 506_2 and 506_3 to enable different numbers of the processor's cores 502_1 through 502_8. Also shown are line buffer units 501_1 to 501_8. Here, the image processor 500 may include configuration register space (not shown in FIG. 5) that, e.g., determines channel select values of the multiplexers so as to put into effect or otherwise implement any particular one of a number of different network configurations (such as any/all of the configurations discussed below). As observed in FIG. 5, if the A channel of a multiplexer pair is selected, the ring continues forward to connect a next pair of processor cores. By contrast, if the B channel of a multiplexer pair is selected, the ring "short circuits" so as to cut off the next pair of processor cores.

FIGS. 6a through 6d show the different ring network and number of active processor core configurations that are possible with the image processor of FIG. 5.

Figure 6A:
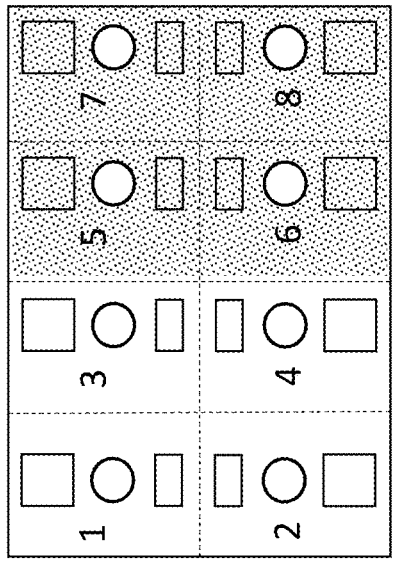
FIGS. 6a, 6b, 6c and 6d show the image processor of FIG. 5 configured with different numbers of active cores.

FIG. 6a corresponds to a configuration where the B channels of multiplexer pair 506_1 have been selected which effectively forms a direct logical connection between node 1 (which corresponds to the position on the ring of processing core 502_1) and node 2 (which corresponds to the position on the ring of processing core 502_2). As observed in FIGS. 5 and 6a, the selection of the B channels of multiplexer pair 506_1 effectively cuts off processing cores 502_3, 502_5, 502_7, 502_8, 502_6 and 502_4 from the ring network. As such, the ring network only couples the I/O unit 505 and processing cores 502_1 and 502_2. This particular configuration may be chosen, for instance, if the application software program that is to execute on the image processor 500 only includes one or two kernels, in which case, no more than two processing cores are activated (cores 502_1 and cores 502_2). The other cores 502_3, 502_5, 502_7, 502_8, 502_6 and 502_4 may be placed, e.g., in an inactive low power state to lower the overall power consumption of the image processor.

Figure 6B:
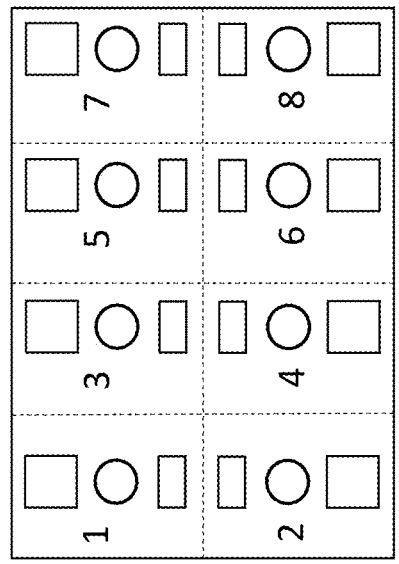

FIG. 6b corresponds to a configuration where the A channels of multiplexer pair 506_1 have been selected and the B channels of multiplexer pair 506_2 have been selected.

This particular multiplexer configuration expands the ring as compared to the configuration of FIG. 6a so that the ring not only couples cores 502_1 and 502_2 but also couples cores 502_3 and 502_4. Here, a direct logical connection is formed between node 3 (which corresponds to the position on the ring of processing core 502_3) and node 4 (which corresponds to the position on the ring of processing core 502_4). As observed in FIGS. 5 and 6b, the selection of the A channels of multiplexer pair 506_1 and the B channels of multiplexer pair 506_2 effectively cuts off processing cores 502_5, 502_7, 502_8 and 502_6 from the ring network. As such, the ring network only couples the I/O unit 505 and processing cores 502_1, 502_2, 502_3 and 502_4.

This particular configuration may be chosen, for instance, if the application software program that is to execute on the image processor 500 only includes three or four kernels, in which case, no more than four processing cores are activated (cores 502_1, 502_2, 502_3 and 502_4). The other cores 502_5, 502_7, 502_8 and 502_6 may be placed, e.g., in an inactive low power state to lower the overall power consumption of the image processor.

Figure 6C:
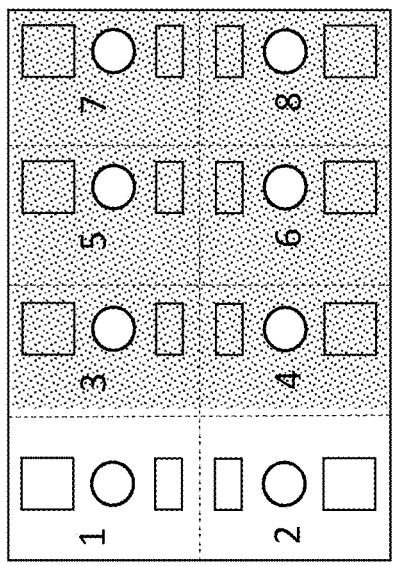

FIG. 6c corresponds to a configuration where the A channels of multiplexer pairs 506_1 and 506_2 have been selected and the B channels of multiplexer pair 506_3 have been selected. This particular multiplexer configuration expands the ring as compared to the configuration of FIG. 6b so that the ring not only couples cores 502_1, 502_2, 502_3 and 502_4 but also couples cores 502_5 and 502_6. Here, a direct logical connection is formed between node 5 (which corresponds to the position on the ring of processing core 502_5) and node 6 (which corresponds to the position on the ring of processing core 502_6). As observed in FIGS. 5 and 6c, the selection of the A channels of multiplexer pair 506_1 and 506_2 and the B channels of multiplexer pair 506_3 effectively cuts off processing cores 502_7 and 502_8 from the ring network. As such, the ring network couples the I/O unit 505 and processing cores 502_1, 502_2, 502_3, 502_4, 502_5 and 502_6.

This particular configuration may be chosen, for instance, if the application software program that is to execute on the image processor 500 only includes five or six kernels, in which case, no more than six processing cores are activated (cores 502_1, 502_2, 502_3, 502_4, 502_5 and 502_6). The other cores 502_7 and 502_8 may be placed, e.g., in an inactive low power state to lower the overall power consumption of the image processor.

Figure 6D:
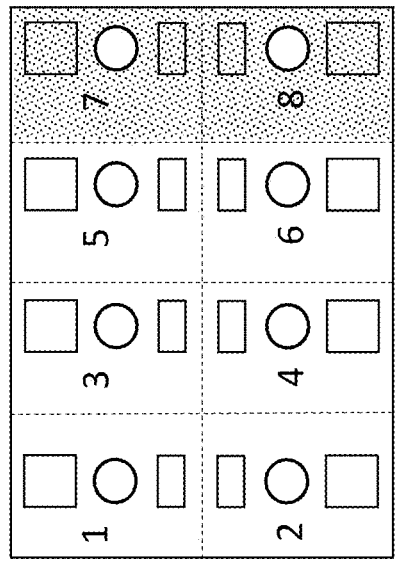

FIG. 6d corresponds to a configuration where the A channels of multiplexer pairs 506_1, 506_2 and 506_3 have been selected. This particular multiplexer configuration expands the ring as compared to the configuration of FIG. 6b so that the ring couples the I/O unit 505 and all of the cores 502_1, 502_2, 502_3, 502_4, 502_5, 502_6, 502_7 and 502_8. Here, the hardwired connection between node 7 (which corresponds to the position on the ring of processing core 502_7) and node 8 (which corresponds to the position on the ring of processing core 502_8) forms the right edge of the ring. This particular configuration may be chosen, for instance, if the application software program that is to execute on the image processor 500 includes seven or eight kernels.

Another pertinent feature of the network ring design of the processor of FIG. 5 is the unique arrangement of address value assignments to the different network nodes. Here, referring briefly back to FIG. 3, note that the processor 300 of FIG. 3 numbers the nodes in series around the ring as per usual. However, the network address assignments on the ring network of FIG. 5 differ from the traditional approach of FIG. 3 so that the numerical addresses on any active network configuration remains continuous and consecutive irrespective of how many cores are configured to be active on the ring.

That is, if the configuration of FIG. 6a is selected, the active numerical addresses on the ring include addresses 0, 1 and 2. By contrast, if the configuration of FIG. 6b is selected, the active numerical addresses on the ring include addresses 0, 1, 2, 3 and 4. Further still, if the configuration of FIG. 6c is selected, the active numerical addresses on the ring include addresses 0, 1, 2, 3, 4, 5 and 6. Finally, if the configuration of FIG. 6d is selected, the active numerical addresses on the ring include addresses 0, 1, 2, 3, 4, 5, 6, 7 and 8.

Arranging the network addresses in this manner can help avoid recompilation of application software source code into multiple different lowest level object code (also referred to as binary code) instances even if such lowest level code is reused across different software applications having different configured numbers of active processor cores and correspondingly different underlying ring network configurations. Here, in various environments, a kernel that is the destination of a communication is identified at the source code level of an application software program with a logical address that theoretically can map to, e.g., any core within the actual hardware processor. However, when the source code is compiled into lower level object or binary code, the logical address is converted into the identity of a specific hardware core on the processor (i.e., one of the specific addresses on the ring network).

For instance, consider an application software program that uses two kernels K1 and K2, where, the I/O unit sends input data to kernel K1, and, kernel K1 sends its output data to kernel K2. After compilation of the source code into lower level object code, assume kernel K1 is assigned to run specifically on core 502_1 and kernel K2 is assigned to run specifically on core 502_2. As such, any object code communication will include a network address of 1 for communications that are sent to kernel K1 and a network address of 2 for communications that are sent to kernel K2.

Owing to the unique arrangement of network node address assignments around the ring, this particular instance of lowest level program code is not only operable on the two core processor configuration of FIG. 6a, but also, each of the other processor core configurations of FIGS. 6b, 6c and 6d. As such, the source code for the application software program that includes kernels K1 and K2 need not be recompiled into different object code instances should the application software program be targeted to run on different ones of the image processor configurations 6a, 6b, 6d, 6e. The lack of a need to recompile provides for greater efficiency with respect to application software development and/or construction.

That is, program code reuse at the object code level is more easily achieved and/or construction of application software can be accomplished at the object code level using instances of object code as pluggable components into a larger object code application. Consider an example where the aforementioned application software program having kernels K1 and K2 performs an operation OP1 that has significant use not only as a stand alone program but also as a front-end operation that is performed before, e.g., a number of other operations having their own unique processing tasks. For simplicity, assume three such other operations exist: 1) OP2 that is implemented with two kernels (e.g., K3 and K4); 2) OP3 that is implemented with three kernels (e.g., K3, K4 and K5); and, 3) OP4 that is implemented with five kernels (e.g., K3, K4, K5, K6 and K7).

Here, consider an application software development environment in which the OP1 front-end operation is compiled to an object code instance in which kernel K2 sends its output data to core 502_3 at network node 3 (e.g., rather than the I/O unit 505 at network node 0). Additionally, assume that the follow-on operations OP2, OP3 and OP4 are compiled into object code instances such that: 1) the first (input, K3) and second (K4) kernels of OP2, OP3 and OP4 operate on cores 502_3 and 502_4 respectively; 2) the third (K5) kernel of OP3 and OP4 operate on core 502_5; and, 3) the fourth (K6) and fifth (K7) kernels of OP4 operate on core 502_6 and 502_7 respectively.

In this case, the compiled front-end OP1 instance can be combined "as is" with any of the compiled OP2, OP3 and OP3 object code instances respectively at the object code level to create three separate immediately executable application software programs: 1) a first application software program that corresponds to OP1+OP2; 2) a second application software program that corresponds to OP1+OP3; and, 3) a third application software program that corresponds to OP1+OP4.

Here, not only is the object code instance of OP1 separately combinable with each of the OP2, OP3 and OP4 object code instances to create three different object code level applications, but also, note that the first application software program (OP1+OP2) that uses four cores can be configured to operate in the processor configuration of FIG. 6b, the second application software program (OP1+OP3) that uses five cores can be configured to operate in the processor configuration of FIG. 6c, and, the third application software program (OP1+OP4) that uses seven cores can be configured to operate in the processor configuration of FIG. 6d.

Thus, not only can the object code instance of OP1 be combined with other object code instances and produce larger working object code level applications, but also, the object code instance of OP1 can be so combined even if the combinations that result in different applications require different processor configurations having different numbers of active hardware cores and correspondingly different internal ring network configurations. That is, program code construction can be accomplished at the object code level that is indifferent to the configuration/number of active cores in the target hardware processor even though the internal network within the processor is different across the different processor configurations.

Furthermore, with use of abstract kernel identifiers at the object code level, any object code program can readily plug into larger object code level constructions and be configured to execute on different processor cores. For example, assume the object code instance of OP3 discussed above as compiled: 1) identifies its first kernel (K3 from the discussion above) with an input variable=BASE; 2) identifies its second kernel (K4 from the discussion above) with an identifier=BASE+1; and, 3) identifies is third kernel (K5 from the discussion above) with an identifier=BASE+2. In this case, the configuration of OP3's object code for utilization with the second (OP1+OP3) application discussed above is straightforward by setting BASE=3.

Moreover, reuse of an identical instance of the OP3 object code for stand alone operation can also be readily accomplished simply by setting BASE=1. The later will cause OP3's first kernel to execute on core 502_1 and its second core to operate on core 502_2 with correct kernel to kernel communications on the network ring. Thus, with a simple change of input variable/configuration information (BASE), identical instances of OP3 at the object code level can be made to readily operate in the processor configuration of FIG. 6c (for the second application (OP1+OP3) discussed just above), or operate as a stand alone application in the processor configuration of FIG. 6a.

As such, identifying the different kernels within an object level program by their network address offsets with respect to one another, identical instances of an object level program can be easily mapped to different processor configurations because the unique addressing pattern on the processor's network ring essentially preserves the meaning of these offsets even though the numbers of nodes on the ring change with each different processor configuration. As such, in many situations, once an object code instance of a program is created, identical copies of it can be reused for many different applications and corresponding configurations as a "plug-in" rather than compiling a new instance of object code from a same source code level for, e.g., each new use of the function of the program or different underlying processor configuration.

The ability to plug-in an object code instance into a larger object code construction is also enhanced if the address from which the input stream originates and/or the address where the output stream is to be sent is also specified as respective input variables at the object code level. For example, again using OP3 as an example, when OP3 is utilized for the second (OP1+OP3) application discussed above and BASE=3, an additional input variable IN that identifies where the input data for OP3 is coming from may be set as IN=2 (K2 of OP1 executing on core 502_2 sends OP3 its input data for the OP1+OP3 application). The destination that identifies where OP3 is to send its output information may be specified with another variable OUT that is set as OUT=0 (OP3 sends its output data to the I/O unit 505 when used in the OP1+OP3 application). As discussed above, with these settings, the object code instance of OP3 can operate within the OP1+OP2 application with the processor being set in the configuration of FIG. 6c.

In order to reuse a copy of the same instance of the OP3 object code for stand alone operation, the input configuration information need only be set to IN=OUT=0 and BASE=1). With this configuration, OP3 will receive its input data from the I/O unit 505 and will send its output data to the I/O unit 505. Also with this configuration, the OP3 instance can operate in the processor configuration of FIG. 6a. As such, identical instance of the OP3 code are essentially indifferent to the underlying processor configuration which includes different internal network ring configurations.

Thus, the overall application software development environment can include the development of smaller granularized application software programs at the source code level that are written to perform basic, often used/reused processing functions. The smaller granularized source code applications are compiled into respective object code instances. The object code instances are then copied as needed and combined with other copies of object code instances to form larger, more comprehensive executable object code level applications.

An even further efficiency can be realized if different hardware platforms exist having different numbers of cores. Here, the discussions above pertaining to FIGS. 6a through 6d were directed to a single hardware platform having eight cores where the eight core platform could be configured with two, four, six or eight active cores. Again, it was shown above that, e.g., a two kernel object code level program (e.g., OP1) could operate on any of these configurations without having two recompile new object code instances for the OP1 program.

This versatility can extend even further to, e.g., a product line composed of: 1) a first hardware platform composed of only two cores that supports a single configuration of two active cores; 2) a second hardware platform composed of four cores that supports a first configuration of two active cores and a second configuration of four active cores; 3) a third hardware platform composed of six cores that supports a first configuration that supports two cores, a second configuration that supports four cores and a third configuration that supports six cores; and, 4) a fourth hardware platform composed of eight cores that supports the four different configurations described above with respect to FIGS. 6a through 6d.

It was described at length above that an object code level program OP1 that uses two kernels would be operable on each of the four configurations of the hardware platform of 4) above. However, if the hardware platforms of 1), 2) and 3) above are designed to enumerate the network nodes as described herein, the object code level program OP1 that is operable on all four configurations of hardware platform 4) above will also be operable on any of: i) the three different configurations of the hardware platform of 3) above; ii) the two different configurations of the hardware platform of 2) above; and, iii) the hardware platform of 1) above. As such, the code re-use capability not only extends to different configurations of a same hardware platform but also the different configurations of different hardware platforms. The code can be stand alone or combined with other object code level programs as described above.

FIG. 7 shows a method described above. As observed in FIG. 7, the method includes configuring 701 a first instance of object code to execute on a processor, the processor having multiple cores and an internal network, the internal network configured in a first configuration that enables a first number of the cores to be communicatively coupled. The method also includes configuring 702 a second instance of the object code to execute on a second instance of the processor, a respective internal network of the second instance of the processor configured in a second configuration that enables a different number of cores to be communicatively coupled, wherein, same positioned cores on the processor and the second instance of the processor have same network addresses for the first and second configurations.

It is pertinent to recognize that ideas described above are not limited to the specific processor of FIG. 5. Here, other processors having, e.g., different numbers of processing cores or even different types of internal network topologies may make use of the teachings herein. That is, other network topologies (e.g., a switched connection network) may be designed to keep the physical addresses of its source/destination nodes constant across different internal network configurations and/or keep the physical addresses continuous and consecutive across the different internal network configurations.

3.0 Image Processor Implementation Embodiments

FIGS. 8a-e through FIG. 12 provide additional details concerning operation and design of various embodiments for the image processor and associated stencil processor described at length above. Recalling from the discussion of FIG. 2 that a line buffer unit feeds line groups to a stencil processor's associated sheet generator, FIGS. 8a through 8e illustrate at a high level embodiments of both the parsing activity of a line buffer unit 201, the finer grained parsing activity of a sheet generator unit 203 as well as the stencil processing activity of the stencil processor 702 that is coupled to the sheet generator unit 203.

Figure 8A:
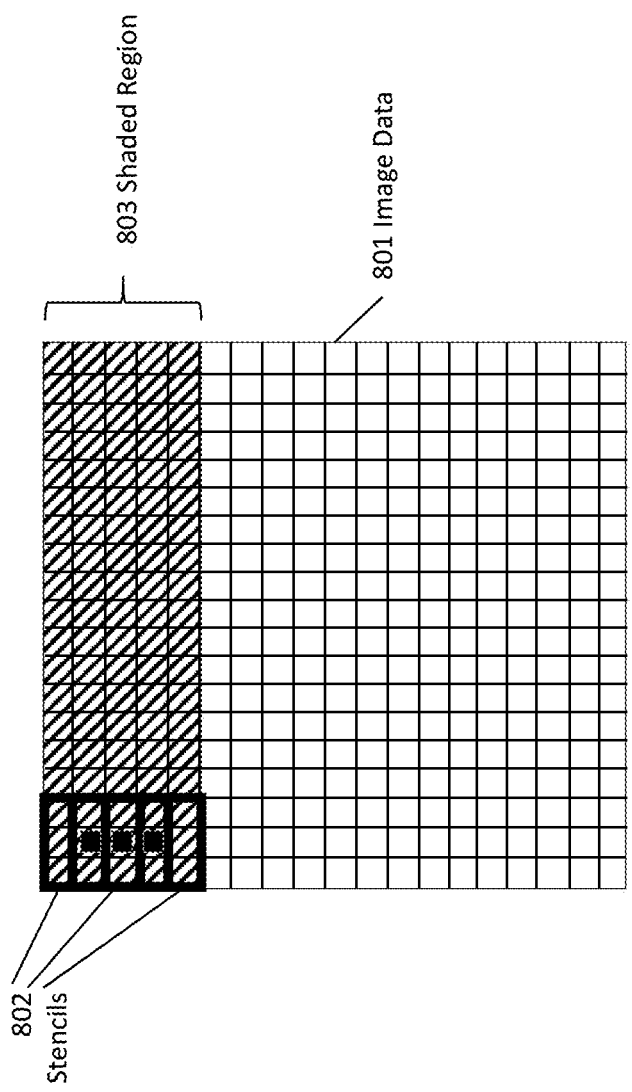
Figure 8C:
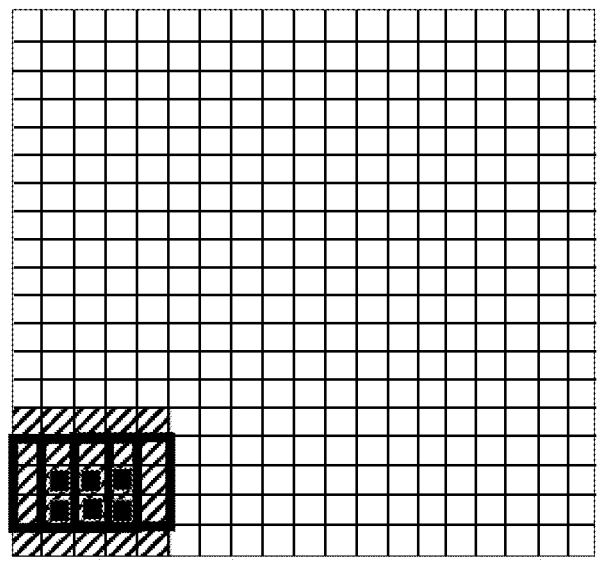
Figure 8D:
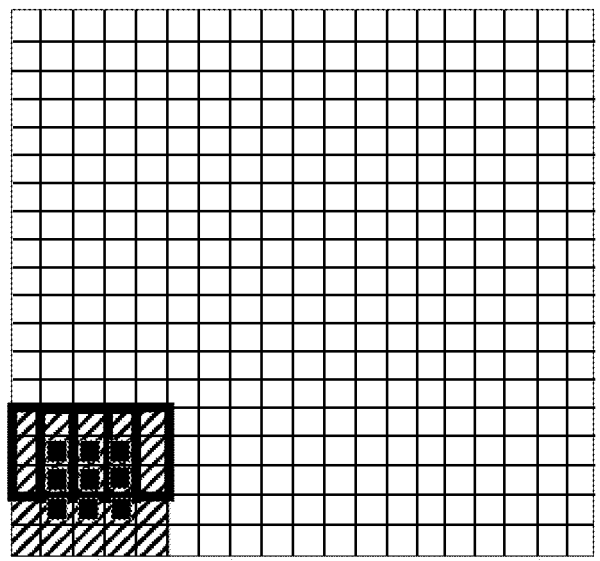

FIG. 8a depicts an embodiment of an input frame of image data 801. FIG. 8a also depicts an outline of three overlapping stencils 802 (each having a dimension of 3 pixels×3 pixels) that a stencil processor is designed to operate over. The output pixel that each stencil respectively generates output image data for is highlighted in solid black. For simplicity, the three overlapping stencils 802 are depicted as overlapping only in the vertical direction. It is pertinent to recognize that in actuality a stencil processor may be designed to have overlapping stencils in both the vertical and horizontal directions.

Because of the vertical overlapping stencils 802 within the stencil processor, as observed in FIG. 8a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 201 is responsible for parsing a line group of input image data from an incoming frame that is sufficient for the stencil processors to operate over for an extended number of upcoming cycles. An exemplary depiction of a line group is illustrated as a shaded region 803. In an embodiment, the line buffer unit 201 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 803 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Thus, as observed in FIG. 8b, the sheet generator parses an initial sheet 804 from the line group 803 and provides it to the stencil processor (here, the sheet of data corresponds to the shaded region that is generally identified by reference number 804). As observed in FIGS. 8*c* and 8*d*, the stencil processor operates on the sheet of input image data by effectively moving the overlapping stencils 802 in a left to right fashion over the sheet. As of FIG. 8*d*, the number of pixels for which an output value could be calculated from the data within the sheet is exhausted (no other pixel positions can have an output value determined from the information within the sheet). For simplicity the border regions of the image have been ignored.

As observed in FIG. 8*e* the sheet generator then provides a next sheet 805 for the stencil processor to continue operations on. Note that the initial positions of the stencils as they begin operation on the next sheet is the next progression to the right from the point of exhaustion on the first sheet (as depicted previously in FIG. 8*d*). With the new sheet 805, the stencils will simply continue moving to the right as the stencil processor operates on the new sheet in the same manner as with the processing of the first sheet.

Note that there is some overlap between the data of the first sheet 804 and the data of the second sheet 805 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

Figure 9A:
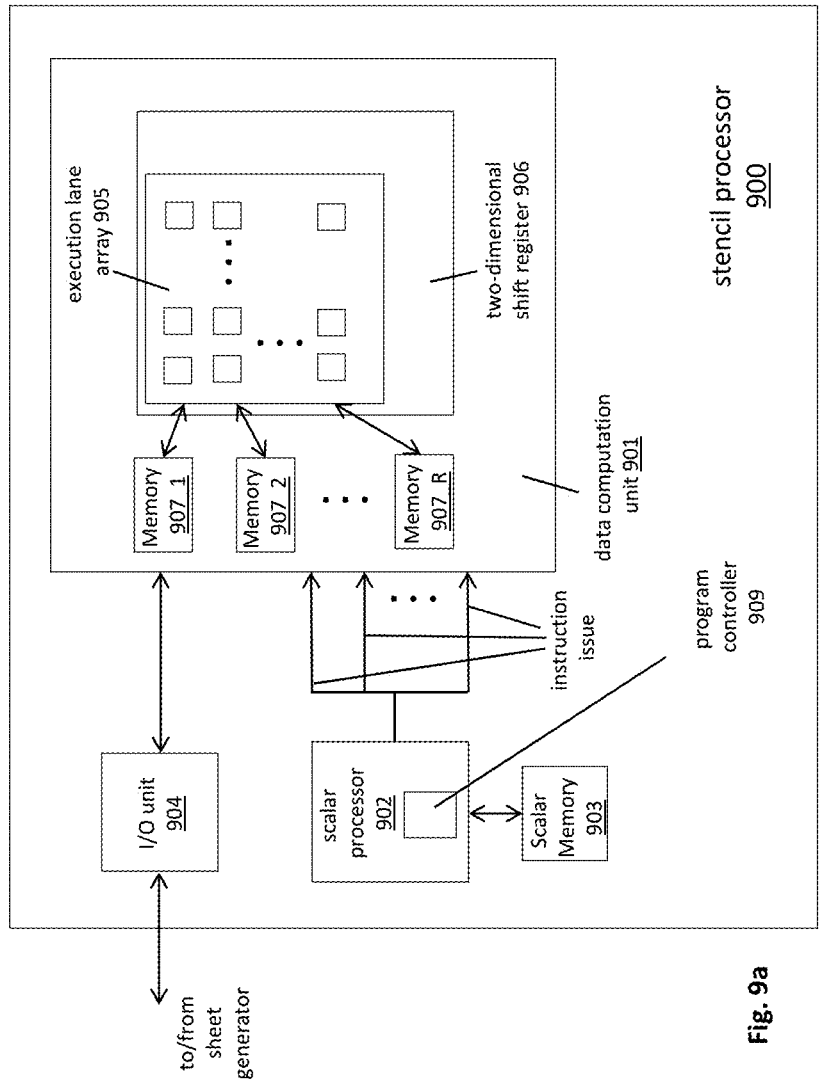
FIG. 9a shows an embodiment of a stencil processor.

FIG. 9 shows an embodiment of a stencil processor architecture 900. As observed in FIG. 9, the stencil processor includes a data computation unit 901, a scalar processor 902 and associated memory 903 and an I/O unit 904. The data computation unit 901 includes an array of execution lanes 905, a two-dimensional shift array structure 906 and separate random access memories 907 associated with specific rows or columns of the array.

The I/O unit 904 is responsible for loading "input" sheets of data received from the sheet generator into the data computation unit 901 and storing "output" sheets of data from the stencil processor into the sheet generator. In an embodiment the loading of sheet data into the data computation unit 901 entails parsing a received sheet into rows/columns of image data and loading the rows/columns of image data into the two dimensional shift register structure 906 or respective random access memories 907 of the rows/columns of the execution lane array (described in more detail below). If the sheet is initially loaded into memories 907, the individual execution lanes within the execution lane array 905 may then load sheet data into the two-dimensional shift register structure 906 from the random access memories 907 when appropriate (e.g., as a load instruction just prior to operation on the sheet's data). Upon completion of the loading of a sheet of data into the register structure 906 (whether directly from a sheet generator or from memories 907), the execution lanes of the execution lane array 905 operate on the data and eventually "write back" finished data as a sheet directly back to the sheet generator, or, into the random access memories 907. If the later the I/O unit 904 fetches the data from the random access memories 907 to form an output sheet which is then forwarded to the sheet generator.

The scalar processor 902 includes a program controller 909 that reads the instructions of the stencil processor's program code from scalar memory 903 and issues the instructions to the execution lanes in the execution lane array 905. In an embodiment, a single same instruction is broadcast to all execution lanes within the array 905 to effect a SIMD-like behavior from the data computation unit 901. In an embodiment, the instruction format of the instructions read from scalar memory 903 and issued to the execution lanes of the execution lane array 905 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 905).

The combination of an execution lane array 905, program controller 909 and two dimensional shift register structure 906 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 905, the random access memories 907 may also keep one or more look-up tables. In various embodiments one or more scalar look-up tables may also be instantiated within the scalar memory 903.

A scalar look-up involves passing the same data value from the same look-up table from the same index to each of the execution lanes within the execution lane array 905. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 905 during the same clock cycle. Additional details concerning use and operation of look-up tables is provided further below.

Figure 9B:
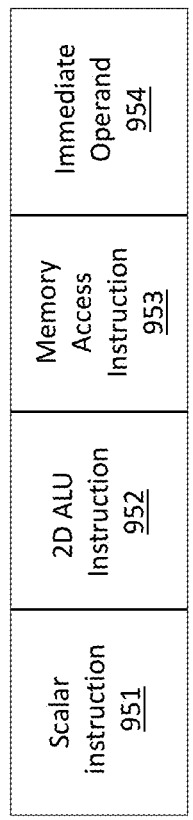
FIG. 9b shows an embodiment of an instruction word of the stencil processor.

FIG. 9*b* summarizes the VLIW instruction word embodiments(s) discussed above. As observed in FIG. 9*b*, the VLIW instruction word format includes fields for three separate instructions: 1) a scalar instruction 951 that is executed by the scalar processor; 2) an ALU instruction 952 that is broadcasted and executed in SIMD fashion by the respective ALUs within the execution lane array; and, 3) a memory instruction 953 that is broadcasted and executed in a partial SIMD fashion (e.g., if execution lanes along a same row in the execution lane array share a same random access memory, then one execution lane from each of the different rows actually execute the instruction (the format of the memory instruction 953 may include an operand that identifies which execution lane from each row executes the instruction).

A field 954 for one or more immediate operands is also included. Which of the instructions 951, 952, 953 use which immediate operand information may be identified in the instruction format. Each of instructions 951, 952, 953 also include their own respective input operand and resultant information (e.g., local registers for ALU operations and a local register and a memory address for memory access instructions). In an embodiment, the scalar instruction 951 is executed by the scalar processor before the execution lanes within the execution lane array execute either of the other to instructions 952, 953. That is, the execution of the VLIW word includes a first cycle upon which the scalar instruction 951 is executed followed by a second cycle upon with the other instructions 952, 953 may be executed (note that in various embodiments instructions 952 and 953 may be executed in parallel).

In an embodiment, the scalar instructions executed by the scalar processor include commands issued to the sheet generator to load/store sheets from/into the memories or 2D shift register of the data computation unit. Here, the sheet generator's operation can be dependent on the operation of the line buffer unit or other variables that prevent pre-runtime comprehension of the number of cycles it will take the sheet generator to complete any command issued by the scalar processor. As such, in an embodiment, any VLIW word whose scalar instruction 951 corresponds to or otherwise causes a command to be issued to the sheet generator also includes no-operation (NOOP) instructions in the other two instruction field 952, 953. The program code then enters a loop of NOOP instructions for instruction fields 952, 953 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 10:
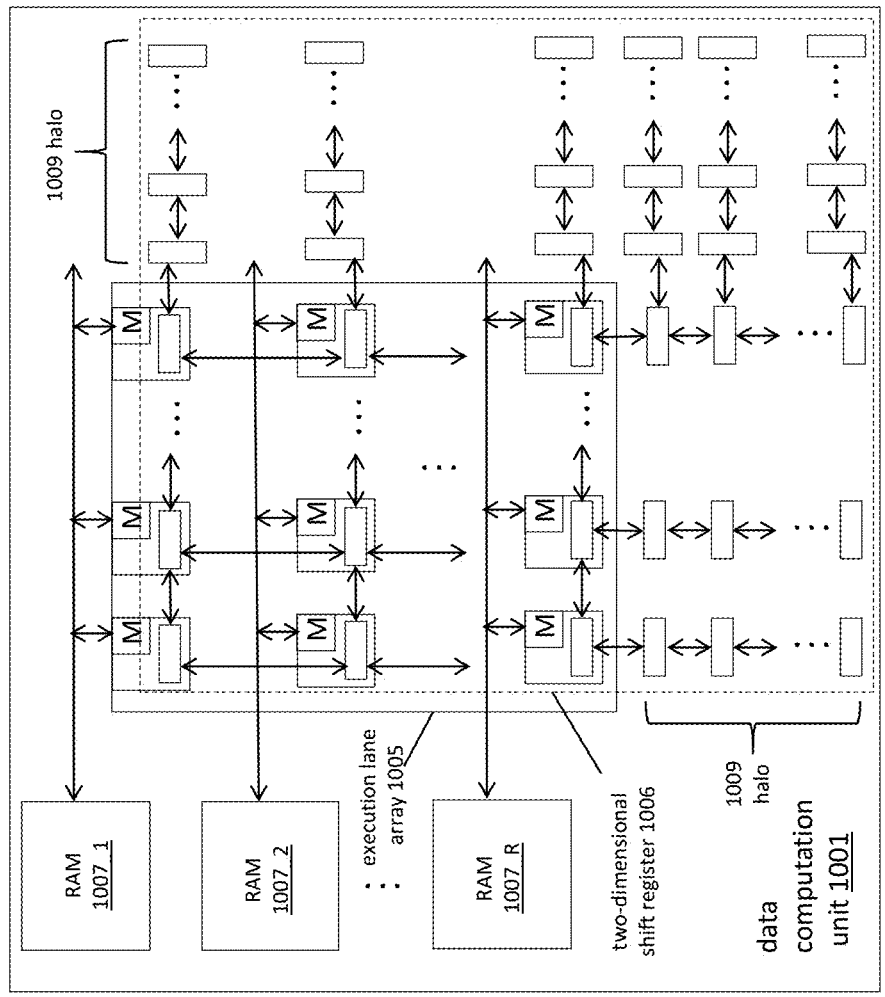
FIG. 10 shows an embodiment of a data computation unit within a stencil processor.

FIG. 10 shows an embodiment of a data computation component 1001. As observed in FIG. 10, the data computation component 1001 includes an array of execution lanes 1005 that are logically positioned "above" a two-dimensional shift register array structure 1006. As discussed above, in various embodiments, a sheet of image data provided by a sheet generator is loaded into the two-dimensional shift register 1006. The execution lanes then operate on the sheet data from the register structure 1006.

The execution lane array 1005 and shift register structure 1006 are fixed in position relative to one another. However, the data within the shift register array 1006 shifts in a strategic and coordinated fashion to cause each execution lane in the execution lane array to process a different stencil within the data. As such, each execution lane determines the output image value for a different pixel in the output sheet being generated. From the architecture of FIG. 10 it should be clear that overlapping stencils are not only arranged vertically but also horizontally as the execution lane array 1005 includes vertically adjacent execution lanes as well as horizontally adjacent execution lanes.

Some notable architectural features of the data computation unit 1001 include the shift register structure 1006 having wider dimensions than the execution lane array 1005. That is, there is a "halo" of registers 1009 outside the execution lane array 1005. Although the halo 1009 is shown to exist on two sides of the execution lane array, depending on implementation, the halo may exist on less (one) or more (three or four) sides of the execution lane array 1005. The halo 1005 serves to provide "spill-over" space for data that spills outside the bounds of the execution lane array 1005 as the data is shifting "beneath" the execution lanes 1005. As a simple case, a 5×5 stencil centered on the right edge of the execution lane array 1005 will need four halo register locations further to the right when the stencil's leftmost pixels are processed. For ease of drawing, FIG. 10 shows the registers of the right side of the halo as only having horizontal shift connections and registers of the bottom side of the halo as only having vertical shift connections when, in a nominal embodiment, registers on either side (right, bottom) would have both horizontal and vertical connections. In various embodiments, the halo region does not include corresponding execution lane logic to execute image processing instructions (e.g., no ALU is present). However, individual memory access units (M) are present in each of the halo region locations so that the individual halo register locations can individually load data from memory and store data to memory.

Additional spill-over room is provided by random access memories 1007 that are coupled to each row and/or each column in the array, or portions thereof (E.g., a random access memory may be assigned to a "region" of the execution lane array that spans 4 execution lanes row wise and 2 execution lanes column wise. For simplicity the remainder of the application will refer mainly to row and/or column based allocation schemes). Here, if a execution lane's kernel operations require it to process pixel values outside of the two-dimensional shift register array 1006 (which some image processing routines may require) the plane of image data is able to further spill-over, e.g., from the halo region 1009 into random access memory 1007. For example, consider a 6×6 stencil where the hardware includes a halo region of only four storage elements to the right of a execution lane on the right edge of the execution lane array. In this case, the data would need to be shifted further to the right off the right edge of the halo 1009 to fully process the stencil. Data that is shifted outside the halo region 1009 would then spill-over to random access memory 1007. Other applications of the random access memories 1007 and the stencil processor of FIG. 9 are provided further below.

FIGS. 11a through 11k demonstrate a working example of the manner in which image data is shifted within the two dimensional shift register array "beneath" the execution lane array as alluded to above. As observed in FIG. 11a, the data contents of the two dimensional shift array are depicted in a first array 1107 and the execution lane array is depicted by a frame 1105. Also, two neighboring execution lanes 1110 within the execution lane array are simplistically depicted. In this simplistic depiction 1110, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 11a through 11k depict one of these deeper register locations as being used to store the resultant X from the respective execution lanes. For illustrative ease the deeper resultant register is drawn alongside rather than beneath its counterpart register R2.

FIGS. 11a through 11k focus on the calculation of two stencils whose central position is aligned with the pair of execution lane positions 1111 depicted within the execution lane array. For ease of illustration, the pair of execution lanes 1110 are drawn as horizontal neighbors when in fact, according to the following example, they are vertical neighbors.

Figure 11A:
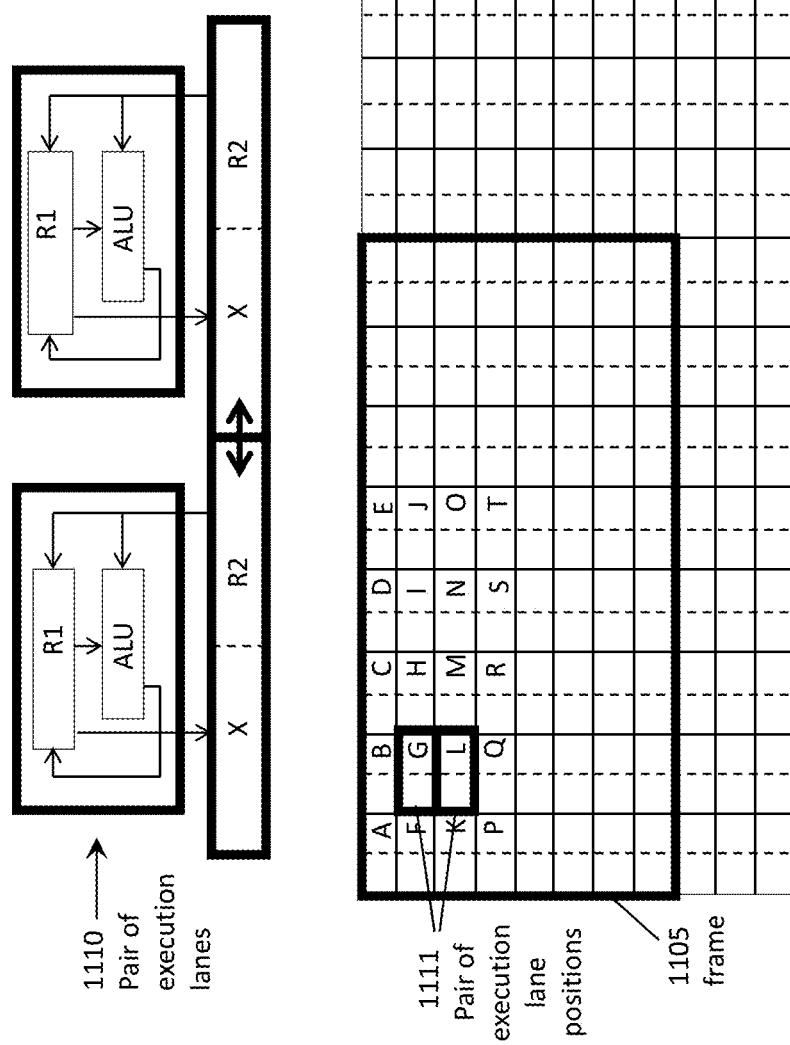
FIGS. 11a, 11b, 11c, 11d, 11e, 11f, 11g, 11h, 11i, 11j and 11k depict an example of the use of a two-dimensional shift array and an execution lane array to determine a pair of neighboring output pixel values with overlapping stencils.
Figure 11B:
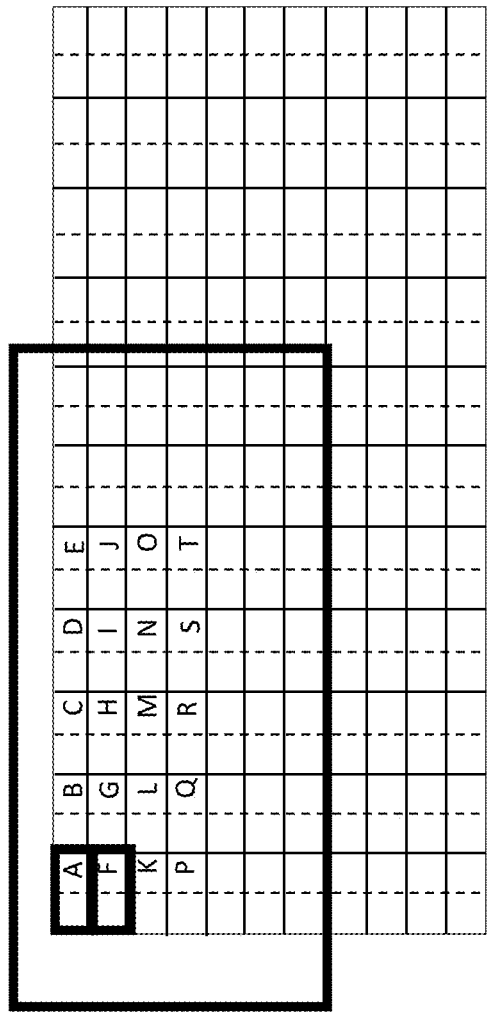

As observed initially in FIG. 11a, the execution lanes are centered on their central stencil locations. FIG. 11b shows the object code executed by both execution lanes. As observed in FIG. 11b the program code of both execution lanes causes the data within the shift register array to shift down one position and shift right one position. This aligns both execution lanes to the upper left hand corner of their respective stencils. The program code then causes the data that is located (in R2) in their respective locations to be loaded into R1.

Figure 11C:
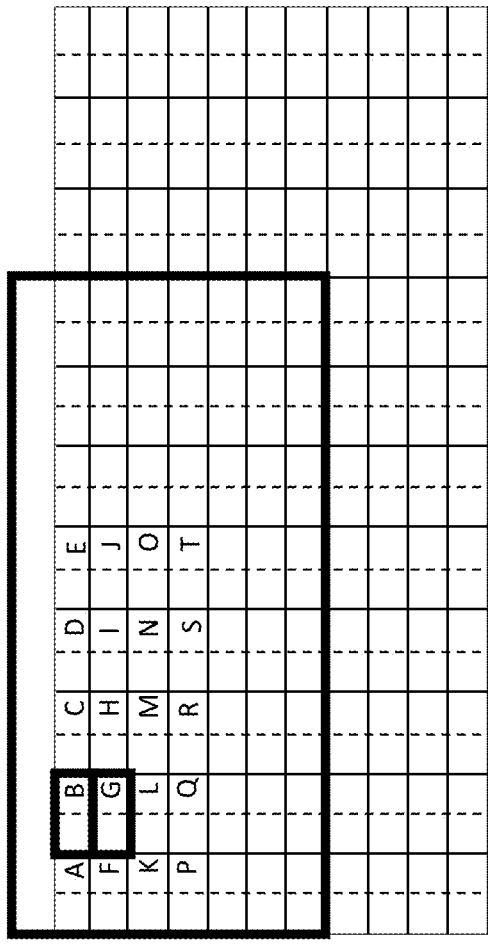
Figure 11D:
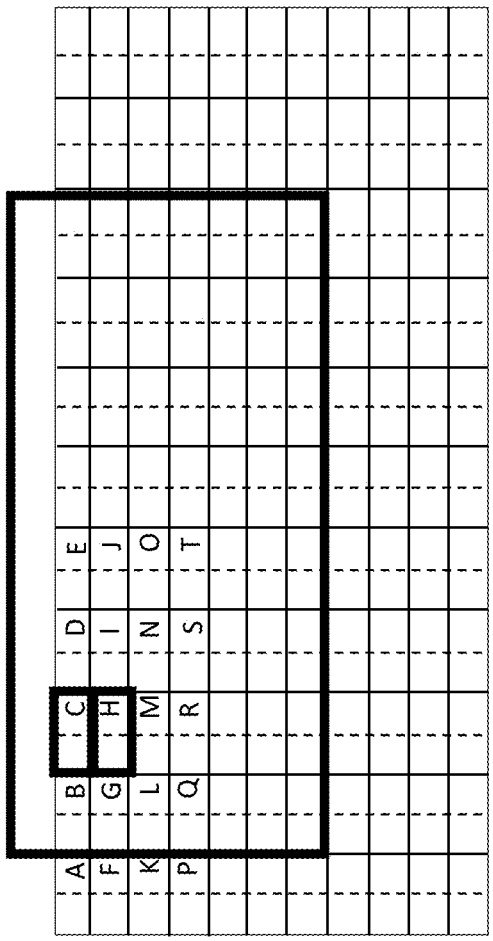

As observed in FIG. 11c the program code next causes the pair of execution lanes to shift the data within the shift register array one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 11d the same process as described above for FIG. 11c is repeated which causes the resultant R1 to now include the value A+B+C in the upper execution lane and F+G+H in the lower execution lane. At this point both execution lanes have processed the upper row of their respective stencils. Note the spill-over into a halo region on the left side of the execution lane array (if one exists on the left hand side) or into random access memory if a halo region does not exist on the left hand side of the execution lane array.

Figure 11E:
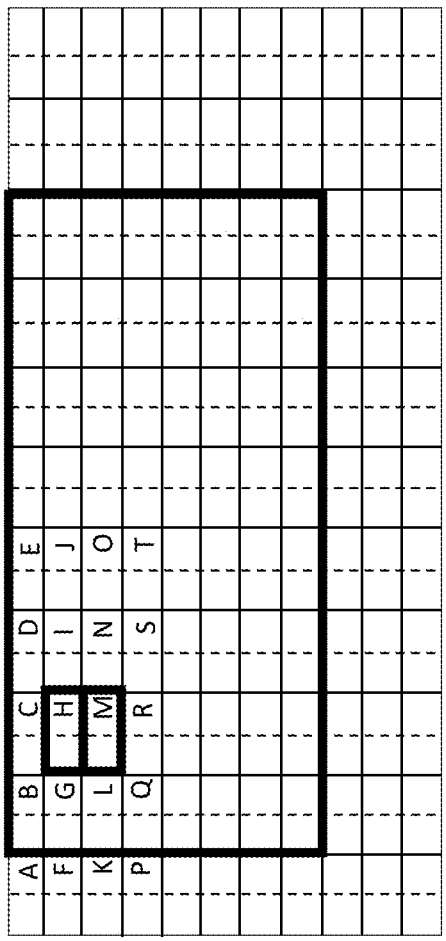
Figure 11F:
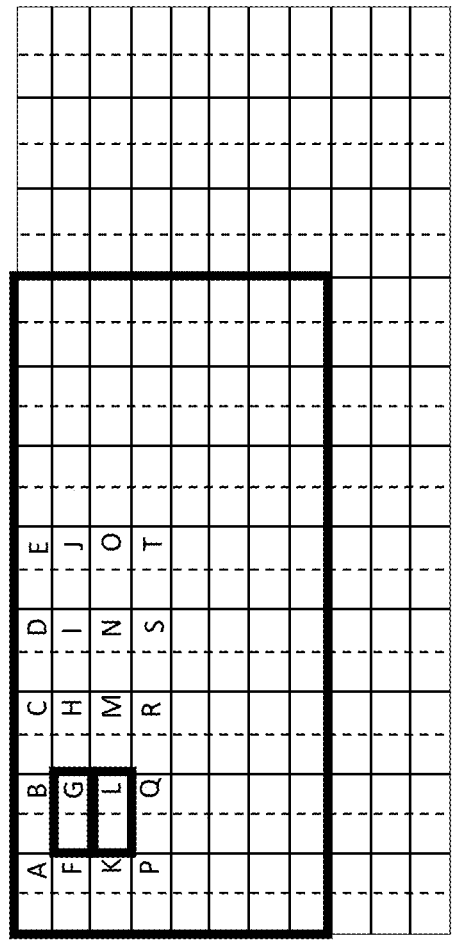
Figure 11G:
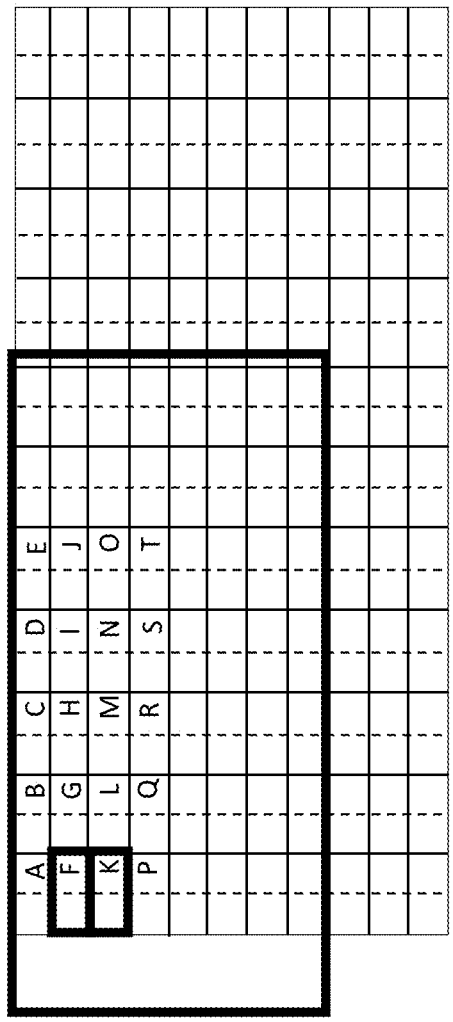

As observed in FIG. 11e, the program code next causes the data within the shift register array to shift one unit up which causes both execution lanes to be aligned with the right edge of the middle row of their respective stencils. Register R1 of both execution lanes currently includes the summation of the stencil's top row and the middle row's rightmost value. FIGS. 11f and 11g demonstrate continued progress moving leftwise across the middle row of both execution lane's stencils. The accumulative addition continues such that at the end of processing of FIG. 11g both execution lanes include the summation of the values of the top row and the middle row of their respective stencils.

Figure 11H:
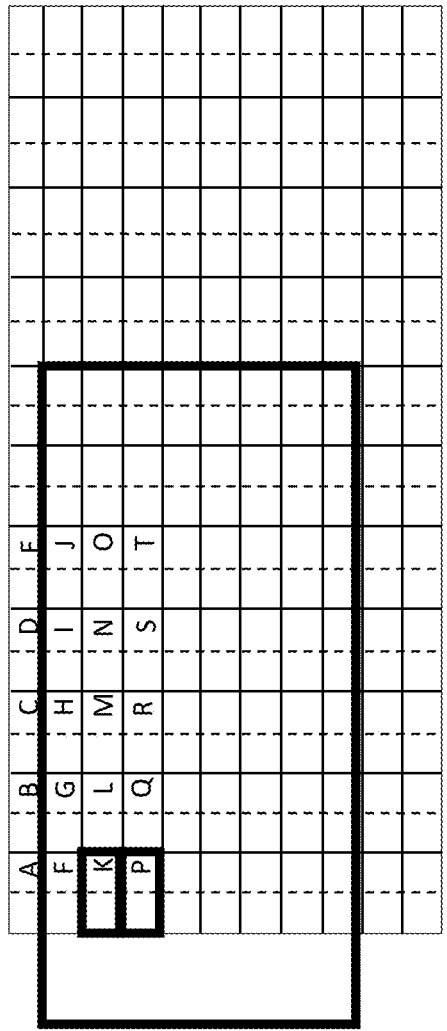
Figure 11I:
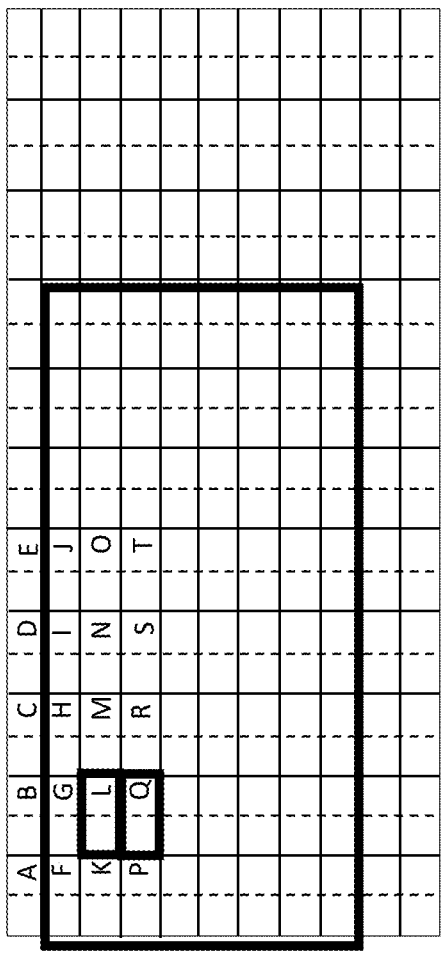
Figure 11J:
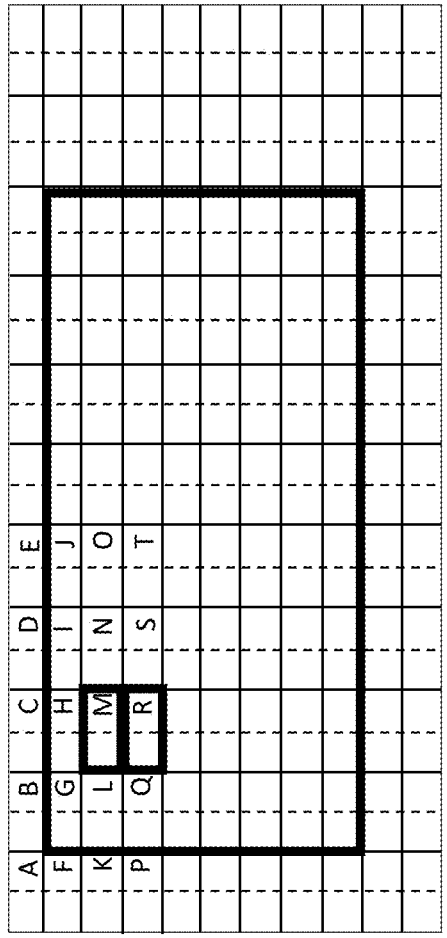
Figure 11K:
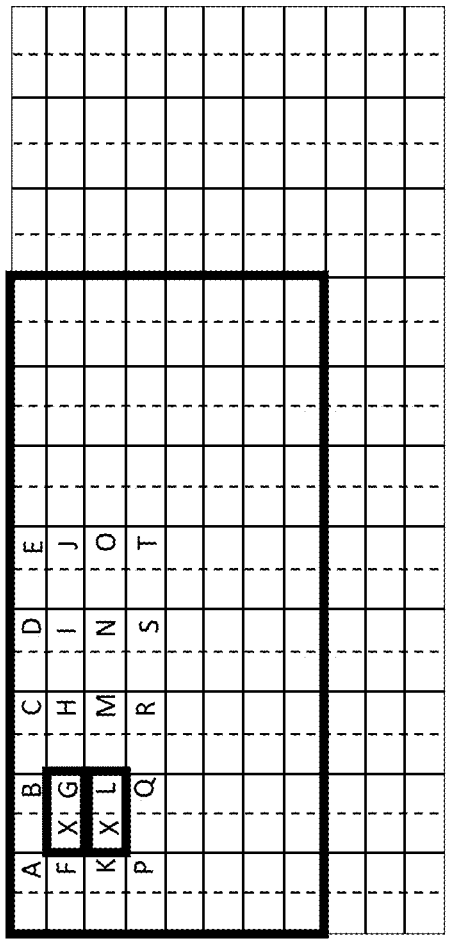

FIG. 11h shows another shift to align each execution lane with its corresponding stencil's lowest row. FIGS. 11i and 11j show continued shifting to complete processing over the course of both execution lanes' stencils. FIG. 11k shows additional shifting to align each execution lane with its correct position in the data array and write the resultant thereto.

In the example of FIGS. 11a-11k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT+1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

FIG. 12 shows another, more detailed depiction of the unit cell for an execution lane and corresponding shift register structure (registers in the halo region do not include a corresponding execution lane but do include a memory unit in various embodiments). The execution lane and the register space associated with each location in the execution lane array is, in an embodiment, implemented by instantiating the circuitry observed in FIG. 12 at each node of the execution lane array. As observed in FIG. 12, the unit cell includes a execution lane 1201 coupled to a register file 1202 consisting of four registers R2 through R5. During any cycle, the execution lane 1201 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 1203, and, having the contents of any of (only) one of registers R2 through R4 replaced with content that is shifted "in" from a corresponding one if its neighbors through input multiplexers 1204 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 1203, 1204 permits for different shift source and shift target registers within a same register file during a same cycle.

As depicted in FIG. 12 note that during a shift sequence a execution lane will shift content out from its register file 1202 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 1203, 1204 observed in FIG. 12 is incorporated into the design of FIG. 12. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of a execution lane's register files are shifted out during a shift sequence note that the content of the non shifted out registers of each execution lane remain in place (do not shift). As such, any non shifted content that is not replaced with shifted in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 1201, in various embodiments, the mathematical opcodes supported by the hardware ALU include (e.g., ADD, SUB, MOV, MUL, MAD, ABS, DIV, SHL, SHR, MIN/MAX, SEL, AND, OR, XOR, NOT). As described just above, memory access instructions can be executed by the execution lane 1201 to fetch/store data from/to their associated random access memory. Additionally the hardware execution lane 1201 supports shift op instructions (right, left, up, down) to shift data within the two dimensional shift register structure. As described above, program control instructions are largely executed by the scalar processor of the stencil processor.

4.0 Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 13 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two. Additionally, the computing system of FIG. 13 also includes many features of a high performance computing system, such as a workstation or supercomputer.

As observed in FIG. 13, the basic computing system may include a central processing unit 1301 (which may include, e.g., a plurality of general purpose processing cores 1315_1 through 1315_N and a main memory controller 1317 disposed on a multi-core processor or applications processor), system memory 1302, a display 1303 (e.g., touchscreen, flat-panel), a local wired point-to-point link (e.g., USB) interface 1304, various network I/O functions 1305 (such as an Ethernet interface and/or cellular modem subsystem), a wireless local area network (e.g., WiFi) interface 1306, a wireless point-to-point link (e.g., Bluetooth) interface 1307 and a Global Positioning System interface 1308, various sensors 1309_1 through 1309_N, one or more cameras 1310, a battery 1311, a power management control unit 1312, a speaker and microphone 1313 and an audio coder/decoder 1314.

An applications processor or multi-core processor 1350 may include one or more general purpose processing cores 1315 within its CPU 1201, one or more graphical processing units 1316, a memory management function 1317 (e.g., a memory controller), an I/O control function 1318 and an image processing unit 1319. The general purpose processing cores 1315 typically execute the operating system and application software of the computing system. The graphics processing units 1316 typically execute graphics intensive functions to, e.g., generate graphics information that is presented on the display 1303. The memory control function 1317 interfaces with the system memory 1302 to write/read data to/from system memory 1302. The power management control unit 1312 generally controls the power consumption of the system 1300.

The image processing unit 1319 may be implemented according to any of the image processing unit embodiments described at length above in the preceding sections. Alternatively or in combination, the IPU 1319 may be coupled to either or both of the GPU 1316 and CPU 1301 as a co-processor thereof. Additionally, in various embodiments, the GPU 1316 may be implemented with any of the image processor features described at length above. The image processing unit 1319 may be configured with application software as described at length above. Additionally, a computing system such as the computing system of FIG. 13 may execute program code to implement the application software development described above.

Each of the touchscreen display 1303, the communication interfaces 1304-1307, the GPS interface 1308, the sensors 1309, the camera 1310, and the speaker/microphone codec 1313, 1314 all can be viewed as various forms of I/O (input and/or output) relative to the overall computing system including, where appropriate, an integrated peripheral device as well (e.g., the one or more cameras 1310).

Depending on implementation, various ones of these I/O components may be integrated on the applications processor/multi-core processor 1350 or may be located off the die or outside the package of the applications processor/multi-core processor 1350.

In an embodiment one or more cameras 1310 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired and/or programmable logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A non transitory machine readable storage medium comprising program code that when processed by a computing system causes a method to be performed, the method comprising:
   configuring a first instance of object code to execute on a first configuration of a processor, the processor having multiple cores and an internal network, the internal network of the first configuration of the processor configured in a first configuration that enables a first number of the multiple cores to be communicatively coupled; and,
   configuring a second instance of the object code to execute on a second configuration of the processor, a respective internal network of the second configuration of the processor configured in a second configuration that enables a second number of multiple cores to be communicatively coupled, wherein, same positioned cores of the first configuration of the processor and the second configuration of the processor have same network addresses,
   wherein the first instance of the object code and the second instance of the object code (i) execute on different sets of cores of the processor, and (ii) address cores in the different sets of cores as offsets from a same base address.

2. The non-transitory machine readable medium of claim 1 wherein one of the first and second instances of the object code is to execute as a smaller component of code within a larger application on its respective configuration of the processor, wherein the larger application is constructed by combining an object code instance of another program with the one of the first and second instances of the object code.

3. The non-transitory machine readable medium of claim 2 wherein the other of the first and second instances of the object code is to execute as a stand alone application on its respective configuration of the processor.

4. The non-transitory machine readable medium of claim 1 wherein the method further comprises:
   configuring a third instance of the object code to execute on another configuration of the processor that enables a different number of cores.

5. A computing system, comprising:
   multiple cores;
   a system memory;
   a system memory controller between the system memory and the multiple cores;
   a non transitory machine readable storage medium storing program code that, when processed by the multiple cores, cause the multiple cores to perform operations comprising:
   configuring a first instance of object code to execute on a first configuration of a processor, the processor having the multiple cores and an internal network, the internal network of the first configuration of the processor configured in a first configuration that enables a first number of the multiple cores to be communicatively coupled; and,
   configuring a second instance of the object code to execute on a second configuration of the processor, a respective internal network of the second configuration of the processor configured in a second configuration that enables a second number of multiple cores to be communicatively coupled, wherein, same positioned cores of the first configuration of the processor and the second configuration of the processor have same network addresses,
   wherein the first instance of the object code and the second instance of the object code (i) execute on different sets of cores of the processor, and (ii) address cores in the different sets of cores as offsets from a same base address.

6. The computing system of claim 5 wherein one of the first and second instances of the object code is to execute as a smaller component of code within a larger application on its respective configuration of the processor, wherein the larger application is constructed by combining an object code instance of another program with the one of the first and second instances of the object code.

7. The computing system of claim 6 wherein the other of the first and second instances of the object code is to execute as a stand alone application on its respective configuration of the processor.

8. The computing system of claim 5 wherein the processor is an image processor.

9. A computer-implemented method comprising:
   configuring a first instance of object code to execute on a first configuration of a processor, the processor having multiple cores and an internal network, the internal network of the first configuration of the processor configured in a first configuration that enables a first number of the multiple cores to be communicatively coupled; and, configuring a second instance of the object code to execute on a second configuration of the processor, a respective internal network of the second configuration of the processor configured in a second configuration that enables a second number of multiple cores to be communicatively coupled, wherein, same positioned cores of the first configuration of the processor and the second configuration of the processor have same network addresses, wherein the first instance of the object code and the second instance of the object code (i) execute on different sets of cores of the processor, and (ii) address cores in the different sets of cores as offsets from a same base address.

10. The method of claim 9, wherein one of the first and second instances of the object code is to execute as a smaller component of code within a larger application on its respective configuration of the processor, wherein the larger application is constructed by combining an object code instance of another program with the one of the first and second instances of the object code.

11. The method of claim 10, wherein the other of the first and second instances of the object code is to execute as a stand alone application on its respective configuration of the processor.

12. The method of claim 9, wherein the method further comprises:

configuring a third instance of the object code to execute on another configuration of the processor that enables a different number of cores.

* * * * *

UNITED STATES PATENT AND TRADEMARK OFFICE
CERTIFICATE OF CORRECTION

| | | |
|---|---|---|
| PATENT NO. | : 10,789,202 B2 | Page 1 of 1 |
| APPLICATION NO. | : 15/594502 | |
| DATED | : September 29, 2020 | |
| INVENTOR(S) | : Redgrave et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 112 days.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*